US012510688B2

(12) United States Patent
Murray et al.

(10) Patent No.: US 12,510,688 B2
(45) Date of Patent: Dec. 30, 2025

(54) MANUFACTURABLE METAMATERIALS FOR ACTIVE INFRARED SYSTEMS

(71) Applicant: BAE Systems Information and Electronic Systems Integration Inc., Nashua, NH (US)

(72) Inventors: Ian B. Murray, Amherst, NH (US); Jeremy B. Reeves, Chelmsford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 394 days.

(21) Appl. No.: 18/054,393

(22) Filed: Nov. 10, 2022

(65) Prior Publication Data
US 2024/0159936 A1     May 16, 2024

(51) Int. Cl.
*G02B 1/00*     (2006.01)
*G08C 23/04*     (2006.01)

(52) U.S. Cl.
CPC ............. *G02B 1/002* (2013.01); *G08C 23/04* (2013.01)

(58) Field of Classification Search
CPC . G02B 1/002; G02B 1/00; G02B 5/20; G02B 5/204; G02B 5/208; G02B 5/26; H04N 23/20; H04N 23/21; H04N 23/23; G08C 23/04
USPC ............... 359/356, 350, 351, 355, 359, 361; 250/338.1, 339.01, 339.02, 339.11, 250/339.14, 341.8
See application file for complete search history.

(56) References Cited

U.S. PATENT DOCUMENTS

| 9,588,255 | B1 | 3/2017 | Tassin et al. |
| 9,753,185 | B2 | 9/2017 | Boulais et al. |
| 10,234,383 | B2 | 3/2019 | Wang et al. |

(Continued)

FOREIGN PATENT DOCUMENTS

| EP | 3270191 B1 | 1/2018 |
| EP | 3312642 A1 | 4/2018 |

(Continued)

OTHER PUBLICATIONS

Amir Arbabi et al., Planar metasurface retroreflector, Nature Photonics, DOI: 10.1038/NPHOTON.2017.96, T. J. Watson Laboratory of Applied Physics, California Institute of Technology, 1200 E California Blvd., Pasadena, CA 91125, USA. 2017.

(Continued)

*Primary Examiner* — Arnel C Lavarias
(74) *Attorney, Agent, or Firm* — Sand, Sebolt & Wernow LPA; Gary McFaline

(57) ABSTRACT

An active infrared system may include at least one metamaterial optical element. The active infrared system may also include at least one lens assembly optically aligned with the at least one metamaterial optical element. The active infrared system may also include at least one active camera optically aligned with the at least one metamaterial optical element. The at least one metamaterial optical element of the active infrared system may also be configured with at least a reflection mode for reflecting at least one light waveband reflected by a remote object and a transmission mode for transmitting a uniform background light that is wider than the at least one light waveband reflected by the remote object.

15 Claims, 6 Drawing Sheets

(56) References Cited

U.S. PATENT DOCUMENTS

| | | | |
|---|---|---|---|
| 10,267,957 B2 | 4/2019 | Kamali et al. | |
| 10,365,416 B2 | 7/2019 | Zhan et al. | |
| 10,416,565 B2 | 9/2019 | Ahmed et al. | |
| 10,642,074 B2 | 5/2020 | Menon | |
| 10,777,970 B2 | 9/2020 | Han et al. | |
| 10,983,047 B2 | 4/2021 | Padilla et al. | |
| 11,120,332 B2 | 9/2021 | Bowen et al. | |
| 11,187,652 B2 | 11/2021 | Altug Yanik et al. | |
| 2014/0131559 A1* | 5/2014 | Yen | G01N 21/553 |
| | | | 250/221 |
| 2022/0086372 A1 | 3/2022 | Menon et al. | |
| 2023/0032609 A1* | 2/2023 | Ringwald | G01S 7/4811 |
| 2024/0231068 A9* | 7/2024 | Liu | G02B 21/365 |

FOREIGN PATENT DOCUMENTS

| | | | |
|---|---|---|---|
| EP | 3620430 A1 | 3/2020 | |
| WO | 2018183774 A1 | 10/2018 | |
| WO | 2022074100 A1 | 4/2022 | |
| WO | WO-2024004538 A1 * | 1/2024 | G01S 17/10 |

OTHER PUBLICATIONS

Viktar Asadchy et al., Optical metamirror: all-dielectric frequency-selective mirror with fully controllable reflection phase, vol. 33, No. 2 / Feb. 2016 / Journal of the Optical Society of America B.

Adadchy et al., Flat Engineered Multichannel Reflectors, Physical Review X 7, 031046 (2017).

Decker et al., High-efficiency light-wave control with all-dielectric optical Huygens' metasurfaces, Nonlinear Physics Centre, Research School of Physics and Engineering, The Australian National University, Canberra ACT 0200, Australia, 2014.

Fattal et al., Flat dielectric grating reflectors with focusing abilities, Article in Nature Photonics · May 2010 DOI: 10.1038/nphoton. 2010.116 · Source: OAI.

Horie et al., High resolution on-chip optical filter array based on double subwavelength grating reflectors, Received Sep. 17, 2015; revised Oct. 30, 2015; accepted Nov. 2, 2015; published Nov. 5, 2015 Nov. 16, 2015 | vol. 23, No. 23 | DOI: 10.1364/OE.23.029848 | Optics Express 29854.

Huang et al., A surface-emitting laser incorporating a high-index-contrast subwavelength grating, Department of Electrical Engineering and Computer Sciences, University of California at Berkeley, California 94720, USA, Published online: Feb. 1, 2007; doi: 10.1038/nphoton.2006.80.

Jahani et al., All-dielectric metamaterials, Nature Nanotechnology Focus | Review Article Published Online: Jan. 7, 2016 | DOI: 10.1038/NNANO.2015.304.

Kamali et al., A review of dielectric optical metasurfaces for wavefront control, arXiv: 1804.09802v1 [physics.optics] Apr. 25, 2018.

Levy et al., Engineering space-variant inhomogeneous media for polarization control, Department of Electrical and Computer Engineering, University of California, San Diego, 9500 Gilman Drive, La Jolla, California 92093-0407, Optics Letters / vol. 29, No. 15 / Aug. 1, 2004.

Liu et al., Optical magnetic mirrors without metals, vol. 1, No. 4 / Oct. 2014 / Optica 250.

Liu et al., Optical magnetic mirrors without metals: supplemental material, http://dx.doi.org/10.1364/optica. 1.000250. Optical Society of America. 2014.

Ma et al., Broadband circular and linear polarization conversions realized by thin birefringent reflective metasurfaces, State Key Laboratory of Millimeter Waves, School of Information Science and Engineering, Southeast University, Nanjing 210096, China, @2014 Optical Society of America.

Ma et al., Independent Controls of Differently-Polarized Reflected Waves by Anisotropic Metasurfaces, State Key Laboratory of Millimeter Waves, School of Information Science and Engineering, Southeast University, Nanjing 210096, China. Scientific Reports, Apr. 15, 2015.

Moitra et al., Experimental demonstration of a broadband all-dielectric metamaterial perfect reflector, Citation: Applied Physics Letters 104, 171102 (2014); doi: 10.1063/1.4873521 View online: http://dx.doi.org/10.1063/1.4873521 View Table of Contents: http://scitation.aip.org/content/aip/journal/apl/104/17?ver=pdfcov Published by the AIP Publishing.

Moitra et al., Large-Scale All-Dielectric Metamaterial Perfect Reflectors, pubs.acs.org/journal/apchd5, ACS Photonics · May 2015.

Pfeiffer et al., Metamaterial Huygens' Surfaces: TailoringWave Fronts with Reflectionless Sheets, PRL 110, 197401 (2013), Selected for a Viewpoint in Physics, Physical Review Letters, week ending May 10, 2013.

Ribot et al., Broadband and efficient diffraction, Laboratoire Charles Fabry de l'Institut d'Optique, CNRS, Univ Paris-Sud, Campus Polytechnique, RD 128, 91127 Palaiswau cedes, France. 2013.

Wang et al., All-dielectric metasurface beam deflector at the visible frequencies. National Laboratory of Solid State Microstructures, College of Engineering and Applied Sciences and Collaborative Innovation Center of Advanced Microstructures, Nanjing University, Nanjing 210093, China. Citation: Opto-Elec Eng, 2017, 44(1): 103-107.

Zhang et al., High efficiency near diffraction-limited midinfrared flat lenses based on metasurface reflectarrays. vol. 24, No. 16 | Aug. 8, 2016 | Optics Express 18024.

Zhou et al., Efficient silicon metasurfaces for visible light, ACS Photonics · Sep. 2016, DOI: 10.1021/acsphotonics.6b00740.

Zhu et al., Flexible photonic metastructures for tunable coloration, vol. 2, No. 3 / Mar. 2015 / Optica 255.

* cited by examiner

MANUFACTURABLE METAMATERIALS FOR ACTIVE INFRARED SYSTEMS

TECHNICAL FIELD

The present disclosure generally relates to active infrared systems having metamaterial optical elements.

BACKGROUND

Generally, transceivers on active systems (e.g., active infrared (IR) systems) rely upon relatively narrow spectral filtering capabilities and functions for reducing background noise and/or energy when analyzing a remote object in a far field. As such, transceivers or active systems are configured to emit a laser beam that is reflected by the remote object in which the transceivers or active systems are collecting reflected laser energy signals with a receiver as compared to passive infrared systems omitting the use of a laser beam. In some instances, perfectly-filtered active receivers may detect small amounts of energy emitted by the remote object that is within the filter passband, but such energy is negligible in magnitude compared to reflected laser energy. In the current field, the use of short-wave infrared (SWIR) spectral filters, mid-wave infrared (MWIR) spectral filters, and as well as long-wave infrared (LWIR) spectral filters are challenging to utilize for reducing background noise and/or energy due to the limited number of available coating materials to be used on these spectral filters. With coating materials, the coating tolerances used in these active systems require a wider bandpass than desired or lower yield of performance. Moreover, stacks of coating layers are angle-dependent, which results in limiting active arrays and sensitivity to layer tolerances which can ultimately require unfeasibly large bandpass widths. As such, improving spectral filtering will improve sensitivity of active infrared systems.

To combat these challenges and/or difficulties, current products and systems used in these fields rely upon certain elements, including etalons or similar elements of the like (e.g., blazed gratings). In regards to etalons, the use of etalons or other similar elements of the like present difficulties as well, including precision alignment and stability during operation and/or active tuning or adjustments to match laser wavebands. In regards to gratings, the use of gratings is suitable for separating one waveband at one incident angle yet lacks flexibility for multichannel imaging systems. More particularly, grating techniques fail to provide enough variables to optimize to multiple laser lines unless such laser lines happen to fall within factors of two.

SUMMARY

The presently disclosed active infrared (IR) system may comprise of at least one optical element formed of metamaterial for spectral filtering desired laser wavelengths as dictated by the implantation. In one aspect, an active IR system presented herein includes at least two metamaterial elements configured to provide spectral combination of multiple laser wavelengths where each metamaterial element includes a reflection mode and a transmission mode. In another aspect, an active IR system presented herein includes at least two metamaterial elements configured to provide narrowband spectral filtering with a lens assembly positioned between the at least two metamaterial elements. In yet another aspect, an active IR system presented herein includes at least one metamaterial element configured to provide narrowband spectral filtering with a lens assembly either positioned between the metamaterial element and an active camera positioned in front of the at least one metamaterial element.

In one aspect, an exemplary embodiment of the present disclosure may provide an infrared system. The infrared system may include at least one metamaterial optical element. The infrared system may also include at least one lens assembly optically aligned with the at least one metamaterial optical element. The infrared system may also include at least one active camera optically aligned with the at least one metamaterial optical element. The at least one metamaterial optical element is configured with at least a reflection mode for reflecting at least one light waveband reflected by a remote object and a transmission mode for transmitting a uniform background light that is wider than the at least one light waveband reflected by the remote object.

This exemplary embodiment or another exemplary embodiment may further include that wherein the at least one metamaterial optical element is configured to reflect the at least one light waveband to one of the at least one lens assembly and the at least one active camera in the reflection mode. This exemplary embodiment or another exemplary embodiment may further include that wherein the at least one metamaterial optical element is configured to transmit the uniform background light to one or both of the at least one lens assembly and the at least one active camera in the transmission mode. This exemplary embodiment or another exemplary embodiment may further include at least another metamaterial optical element configured with at least another second reflection mode for reflecting at least another light waveband reflected by the remote object and a second transmission mode for transmitting the uniform background light. This exemplary embodiment or another exemplary embodiment may further include that the at least one metamaterial optical element comprises: a first metamaterial optical element having a first reflection mode for reflecting a first light waveband reflected by the remote object and a first transmission mode for transmitting the uniform background light; wherein the first metamaterial optical element is configured to reflect the first light waveband to the at least one active camera in the first reflection mode; wherein the first metamaterial optical element is configured to transmit the uniform background light to the at least one active camera in the first transmission mode. This exemplary embodiment or another exemplary embodiment may further include that the at least one metamaterial optical element comprises: a second metamaterial optical element having a second reflection mode for reflecting a second light waveband reflected by the remote object and a second transmission mode for transmitting the uniform background light; wherein the second metamaterial optical element is configured to reflect the second light waveband to the at least one active camera in the second reflection mode; wherein the first metamaterial optical element is configured to transmit the uniform background light to the at least one active camera and the first light waveband to the at least one active camera in the second transmission mode. This exemplary embodiment or another exemplary embodiment may further include that the first reflection mode of the first metamaterial optical element and the second reflection mode of the second metamaterial optical element are different; and wherein the first transmission mode of the first metamaterial optical element and the second transmission mode of the second metamaterial optical element are different. This exemplary embodiment or another exemplary embodiment may further include that the at least one metamaterial optical element further comprises: a first metamaterial optical element having a first reflecting mode configured to reflect a first range of laser wavelengths to the at least one lens assembly; and a second metamaterial optical element having a second reflecting mode configured to reflect a second range of laser wavelengths received from the at least one lens assembly; wherein the first range of wavelengths and the second range of wavelengths are different. This exemplary embodiment or another exemplary embodiment may further include that the first metamaterial optical element is configured to be used as a bandpass filter and is optically positioned in front of the lens assembly; and wherein the second metamaterial filter is a cold filter and is optically positioned between the at least one lens assembly and the at least one active camera. This exemplary embodiment or another exemplary embodiment may further include at least one beam removal element optically aligned with the at least one metamaterial optical element; wherein the at least one metamaterial optical element transmits at least another light waveband to the beam removal element. This exemplary embodiment or another exemplary embodiment may further include at least one cold plate optically aligned with the at least one metamaterial optical element and adjacent with the at least one beam removal element; wherein the at least one cold plate is configured to emit the uniform background light to provide a background noise at the at least one active camera. This exemplary embodiment or another exemplary embodiment may further include that a first filter structure formed on the at least one metamaterial optical element; wherein the first filter structure is configured to reflect a first range of incident angles of the at least one light waveband. This exemplary embodiment or another exemplary embodiment may further include a second filter structure formed on the at least one metamaterial optical element; wherein the second filter structure is configured to reflect a second range of incident angles of the at least one light waveband that is different than the first range of incident angles of the at least one light waveband. This exemplary embodiment or another exemplary embodiment may further include that when the at least one metamaterial optical element reflects the at least one light waveband to the at least one lens assembly, the least one metamaterial optical element is provided with the first filter structure; and wherein when the at least one metamaterial optical element reflects the at least one light waveband to the at least one active camera, the least one metamaterial optical element is provided with the second filter structure. This exemplary embodiment or another exemplary embodiment may further include at least one metamaterial provided on at least one surface of the at least one metamaterial optical element; and at least another metamaterial provided on at least another surface of at least another metamaterial optical element; wherein each of the at least one metamaterial and the at least another metamaterial is configured to achromatically steer the at least one light waveband at at least one angle to one of the at least one lens assembly and the at least one active camera.

In another aspect, an exemplary embodiment of the present disclosure may provide a method. The method may comprise steps of receiving a light reflected by a remote object; reflecting at least one laser waveband of the light, via at least one metamaterial optical element of an active infrared system, to one of at least one lens assembly of the active infrared system and at least one active camera of the active infrared system; transmitting at least another laser waveband of the light, via the at least one metamaterial optical element of the active infrared system, to one of the at least one lens assembly of the active infrared system and the at least one active camera of the active infrared system, wherein the at least another laser waveband of the light is different than the at least one laser waveband of the light; and generating an image by the at least one active camera.

This exemplary embodiment or another exemplary embodiment may further include that the step of reflecting the at least one laser waveband of the light further comprises: reflecting a first laser waveband of the light of the remote object, via a first metamaterial optical element of the active infrared system, to one of the at least one lens assembly of the active infrared system and the at least one active camera of the active infrared system; and reflecting a second laser waveband of the light of the remote object, via a second metamaterial optical element of the active infrared system, to one of the at least one lens assembly of the active infrared system and the at least one active camera of the active infrared system. This exemplary embodiment or another exemplary embodiment may further include a step of emitting a uniform background light by at least one cold plate of the active infrared system; and wherein the step transmitting the at least another laser waveband of the light further comprises: transmitting the uniform background light, via the first metamaterial optical element of the active infrared system, to one of the at least one lens assembly of the active infrared system and the at least one active camera of the active infrared system; and transmitting the uniform background light and the first laser waveband of the light, via the second metamaterial optical element of the active infrared system, to one of the at least one lens assembly of the active infrared system and the at least one active camera of the active infrared system. This exemplary embodiment or another exemplary embodiment may further include that the step of reflecting the at least one laser waveband of the light further comprises: reflecting a first range of laser wavebands, via a first metamaterial optical element of the active infrared system, to the at least one lens assembly; and reflecting a second range of laser wavebands, via a second metamaterial optical element of the active infrared system, to the at least one active camera upon receiving the first range of laser wavebands from the at least one lens assembly. This exemplary embodiment or another exemplary embodiment may further include a step of emitting a uniform background light by at least one cold plate of the active infrared system; wherein the step of reflecting the at least one laser waveband of the light further comprises: reflecting a first laser waveband of the light of the remote object, via the at least one metamaterial optical element, to the at least one lens assembly; and wherein the step of transmitting the at least another laser waveband of the light further comprises: transmitting a second laser waveband of the light of the remote object, via the at least one metamaterial optical element, to a beam removal element of the active infrared system; and transmitting the uniform background light to the at least one lens assembly and the at least one active camera. This exemplary embodiment or another exemplary embodiment may further include a step of emitting a uniform background light by at least one cold plate of the active infrared system; wherein the step of reflecting the at least one laser waveband of the light further comprises: reflecting a first waveband of the light of the remote object, via the at least one metamaterial optical element, to the at least one active camera upon receiving the first waveband of the light from the at least one lens assembly; and wherein the step of transmitting the at least another waveband of the light further comprises: transmitting a second waveband of the light of the remote object, via the at least one metamaterial optical element, to a beam removal element of the active infrared system; and transmitting the uniform background light to the at least one active camera. This exemplary embodiment or another exemplary embodiment may further include that the step of reflecting the at least one laser waveband of the light further comprises: steering a first laser waveband of the light, via at least one metamaterial provided on at least one surface of the at least one metamaterial optical element, towards one of the at least one lens assembly and the at least one active camera; and steering a second laser waveband of the light, via at least another metamaterial provided on at least another surface of at least another metamaterial optical element towards one of the at least one lens assembly and the at least one active camera; wherein the at least one metamaterial optical filter and the at least another metamaterial optical filter are optically adjacent to one another.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
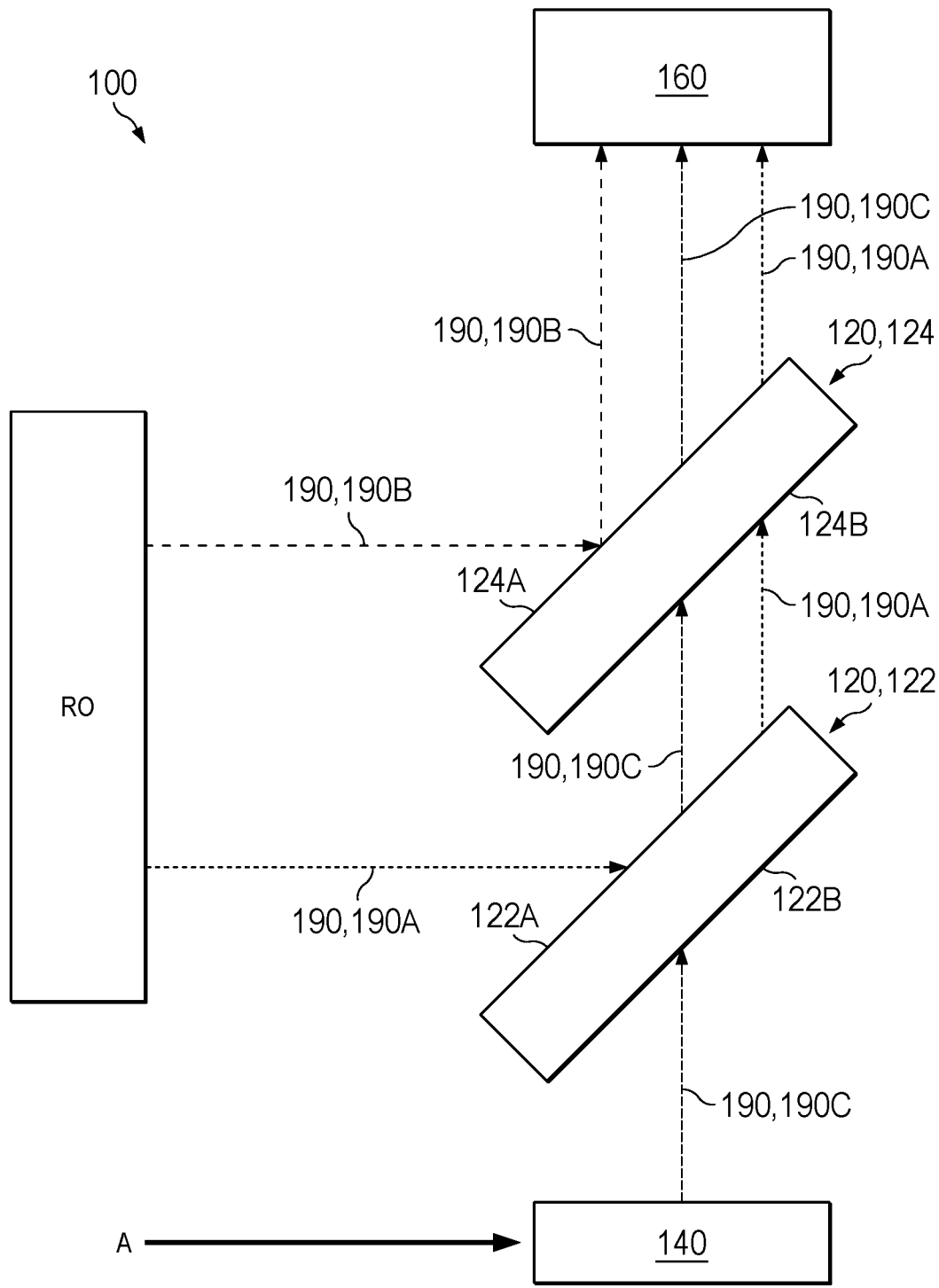
FIG. 1 is a schematic view of an active infrared (IR) system according to one aspect of the present disclosure.

FIG. 1 illustrates an active infrared (IR) system generally referred to as 100. As described in more detail below, the active IR system 100 is configured to use at least one optical element or a set of optical elements formed of desired metamaterials designed to provide spectral combination of multiple laser wavelengths or laser wavebands in a single system. Such components and elements that make up the active IR system 100 are described in more detail below. In this embodiment, however, active IR system 100 is configured to use at least one spectral filter or a set of spectral filters formed of desired metamaterials designed to provide spectral combination of multiple laser wavelengths or laser wavebands in a single system.

As described above, active IR system 100 is configured to have at least one metamaterial filter 120 that is designed to provide spectral combination of multiple laser wavelengths reflected by at least one remote object "RO" in the field. In one aspect, active IR system 100 includes a first metamaterial filter 122 configured to initially receive laser wavelengths (relative to direction arrow "A" in FIG. 1) reflected by at least one remote object "RO" in the field. As best seen in FIG. 1, first metamaterial filter 122 includes a first surface 122A that faces in a first direction towards the at least one remote object "RO" in the far field. As described in more detail below, first metamaterial filter 122 may be designed with a first reflection structure and/or mode formed along the first surface 122A to reflect at least one laser wavelength reflected by the at least one remote object "RO". First metamaterial filter 122 also includes a second surface 122B that faces in a second direction opposite to the first direction of the first surface 122A and away from the at least one remote object "RO" in the far field. As described in more detail below, first metamaterial filter 122 may be designed with a first transmission structure and/or mode formed along one or both of the first surface 122A and the second surface 122B to transmit at least another laser wavelength reflected by the at least one remote object "RO" in the field or a uniform wavelength reflected by a device provided in the active IR system 100.

It should be understood that first metamaterial filter 122 may be formed of any suitable metamaterials that are configured to reflect specific laser wavelengths and/or transmit specific laser wavelengths dictated on the implementation of the first metamaterial filter 122. In one example, a portion of the first metamaterial filter 122 (e.g., first surface 122A of first metamaterial filter 122) may be formed of a first metamaterial that is configured to reflect a first laser wavelength. Continuing with this example, another portion of the first metamaterial filter 122 (e.g., one or both of the first surface 122A and the second surface 122B of first metamaterial filter 122) may be formed a second metamaterial that is configured to transmit a second laser wavelength and/or background wavelength where the second metamaterial is different than the first metamaterial.

In another aspect, active IR system 100 may include a second metamaterial filter 124 configured to receive laser wavelengths reflected by at least one remote object "RO" in the field. As best seen in FIG. 1, second metamaterial filter 124 is also configured to initially receive laser wavelengths from the at least one remote object "RO" (relative to direction arrow "A"). In this embodiment, the second metamaterial filter 124 is positioned optically above the first metamaterial filter 122 and optically aligned with the first metamaterial filter 122. Second metamaterial filter 124 includes a first surface 124A that faces in a first direction towards the at least one remote object "RO" in the far field. As described in more detail below, second metamaterial filter 124 may be designed with a second reflection structure and/or mode to reflect at least one laser wavelength reflected by the at least one remote object "RO" in the far field. Second metamaterial filter 124 also includes a second surface 124B that faces in a second direction opposite to the first direction of the first surface 124A and away from the at least one remote object "RO" in the far field. As described in more detail below, second metamaterial filter 124 may be designed with a second transmission structure and/or mode to transmit at least another laser wavelength reflected by the at least one remote object in the field or a uniform wavelength emitted by a device provided in the active IR system 100.

It should also be understood that second metamaterial filter 124 may be formed of any suitable metamaterials that are configured to reflect specific laser wavelengths and/or transmit specific laser wavelengths dictated on the implementation of the second metamaterial filter 124. In one example, a portion of the second metamaterial filter 124 (e.g., first surface 124A of second metamaterial filter 124) may be formed of a first metamaterial that is configured to reflect a first laser wavelength. Continuing with this example, another portion of the second metamaterial filter 124 (e.g., one or both of the first surface 124A and the second surface 124B of second metamaterial filter 124) may be formed a second metamaterial that is configured to transmit a second laser wavelength and/or background wavelength where the second metamaterial is different than the first metamaterial.

Still referring to FIG. 1, active IR system 100 may also include at least one cold plate 140 that is positioned optically below the first metamaterial filter 122 and the second metamaterial filter 124. The at least one cold plate 140 is configured to emit and/or provide uniform laser wavelength or low background noise to at least one active camera in the active IR system 100, which is described in more detail below. It should be understood that the at least one cold plate 140 may be any suitable and commercially available cold plate 140 for emitting and/or providing a uniform laser wavelength or low background noise to at least one active camera in an active IR system. In one example, the cold plate 140 may also be formed of a metamaterial that is configured to emit and/or provide uniform laser wavelength or low background noise to at least one active camera in the active IR system 100.

It should be understood that the term "cold" in "cold filter" or other terms described herein using the term "cold" refers to the removal of background noise and/or background energy found in the surrounding scene of the remote object. Stated differently, the cold filters and/or components using the term "cold" are configured to "cool" the surfaces that emit the background signal (e.g., noise, shot noise, blackbody radiation) and thereby reduce the background signal received by the active IR system during operation while allowing the desired laser wavelengths or energy to reach the at least one active camera in the active IR system.

Still referring to FIG. 1, active IR system 100 may also include at least one active camera 160 that is positioned optically above the first metamaterial filter 122 and the second metamaterial filter 124. The at least one active camera 160 may be configured to detect and generate an image of the remote object formed from the laser wavelengths reflected and transmitted by the first metamaterial filter 122 and the second metamaterial filter 124. It should be understood that the at least one active camera 160 may be any suitable and commercially available active camera for detecting and generating an image of the remote object formed from the laser wavelengths reflected and transmitted by at least one metamaterial of an active IR system and/or by an active camera of active IR system. It should also be understood that the remote object "image" of an active infrared system described herein may consist of as few as one pixel, while also including true images formed by arrays of pixels.

As illustrated in FIG. 1, the first metamaterial filter 122 and the second metamaterial filter 124 may be optically oriented at any suitable angle relative to the at least one active camera 160. In one aspect, the first metamaterial filter 122 is optically oriented at a first angle relative to the at least one active camera 160 where the first surface 122A is facing in the direction of the at least one active camera 160 and the second surface 122B is facing away from the at least one active camera 160. Continuing with this aspect, the second metamaterial filter 124 is optically oriented at a second angle relative to the at least one active camera 160 where the first surface 124A is facing in the direction of the at least one active camera 160 and the second surface 124B is facing away from the at least one active camera 160. In this aspect, the first angle and the second angle are equal to one another in that the first metamaterial filter 122 and the second metamaterial filter 124 are parallel with one another.

Generally, active IR system 100 may include a housing or similar structure containing each of the component described herein, as dictated by the desired implementation. Such housing is not shown in FIG. 1 but may be included in any suitable position, shape, form, and/or with any desired features, as dictated by the desired implementation.

It should be understood that the configurations of the first metamaterial filter 122 and the second metamaterial filter 124 may be used in current active IR systems and/or platforms including, but not limited to, airborne-based platforms (e.g., laser radar), sea-based platforms (e.g., active imaging through fog), and land-based platforms (e.g., active infrared security systems).

The configurations of the first metamaterial filter 122 and the second metamaterial filter 124 are also considered advantageous at least because the metamaterials provide the ability to tailor performance and use based on the desired and convenient polarization state, which is generally not feasible with conventional optical elements like wire-grid polarizers that require precise linear polarization of both the transmitted laser wavelengths and reflected laser wavelengths. Moreover, configurations of the first metamaterial filter 122 and the second metamaterial filter 124 provide subwavelength structures to mitigate diffraction into unwanted orders.

It should be understood that the first metamaterial filter 122 and the second metamaterial filter 124 may be different in reflecting and/or transmitting various types of laser wavelengths to the at least one active camera 160. In one instance, the first reflection mode of the first metamaterial filter 122 may be configured to reflect at least one laser wavelength to the at least one active camera 160, and the second reflection mode of the second metamaterial filter 124 may be configured to reflect at least another laser wavelength to the at least one active camera 160 that is different than the at least one laser wavelength (e.g., less than the at least one laser wavelength or greater than the at least one laser wavelength). In another instance, the first transmission mode of the first metamaterial filter 122 may be configured to transmit the uniform background light to the at least one active camera 160, and the second transmission mode of the second metamaterial filter 124 may be configured to reflect at least two laser wavelengths to the at least one active camera 160 wherein the at least one laser wavelength is one of the at least two laser wavelengths transmitted by the second metamaterial filter 124

Having now described the components and elements of active IR system 100, a method of using active IR system 100 is described in more detail below.

During operation, the active IR system 100 is configured to receive and reflect desired laser wavelengths of a light emitted or reflected by the at least one remote object "RO" located in the far field. As illustrated in FIG. 1, each of the first metamaterial filter 122 and the second metamaterial filter 124 initially receives light 190 reflected by the at least one remote object "RO" (in the direction arrow "A") in which the light 190 may include various laser wavelengths. As described in more detail below, the first metamaterial filter 122 and the second metamaterial filter 124 are configured to reflect and/or transmit specific laser wavelengths of light 190 to the at least one active camera 160 to generate images of the remote object via spectral combination of at least two laser wavelengths.

As best seen in FIG. 1, a first laser wavelength 190A of light 190 reflected by the at least one remote object "RO" is received at the first surface 122A of first metamaterial filter 122. Upon receiving the first laser wavelength 190A, the first surface 122A reflects the first laser wavelength 190A towards the second metamaterial filter 124 and the at least one active camera 160. In the illustrated embodiment, the first metamaterial filter 122 is configured to reflect the first laser wavelength 190A and no other laser wavelength of light 190 reflected by the at least one remote object "RO" located in the far field. It should be understood that the first metamaterial filter 122 may be configured to reflect any suitable laser wavelength of a light received from the at least one remote object in the far field dictated by the implementation of the active IR system 100.

Still referring to FIG. 1, a second laser wavelength 190B of light 190 reflected by the at least one remote object "RO" is received at the first surface 124A of the second metamaterial filter 124. Upon receiving the second laser wavelength 190B, the first surface 124A reflects the second laser wavelength 190B towards the at least one active camera 160. In the illustrated embodiment, the second metamaterial filter 124 is configured to reflect the second laser wavelength 190B and no other laser wavelength of light 190 reflected by the at least one remote object "RO" located in the far field. It should be understood that the second metamaterial filter 124 may be configured to reflect any suitable laser wavelength of a light reflected by at least remote object in the far field dictated by the implementation of the active IR system 100.

Still referring to FIG. 1, a third laser wavelength or uniform background light 190C may be emitted by the at least one cold plate 140 to provide background noise or background light to the at least one active camera 160 for generating an image of the remote object "RO" detected by the active IR system 100. As illustrated herein, the third laser wavelength 190C may be directed at the second surface 122B of the first metamaterial filter 122 and be transmitted and/or pass through the first metamaterial filter 122 towards the second metamaterial filter 124. The second laser wavelength 190B and the third laser wavelength 190C may also be directed at the second surface 124B of the second metamaterial filter 124 and be transmitted and/or pass through the second metamaterial filter 124 towards the at least one active camera 160. As such, the second metamaterial filter 124 is configured to transmit both the second laser wavelength 190B and the third laser wavelength 190C to the at least one active camera 160.

In this particular embodiment, the spectral bandpass of active camera 160 may be limited by a focal plane quantum efficiency configured with the active camera 160 and by filtering provided by a cold filter (e.g., cold filter 140). In one instance, active camera 160 may be sensitive to laser wavelengths from about 3 μm up to about 5 μm with the cold filter 140 passing through the entire laser band in a MWIR detector configuration. In this same instance, the first laser wavelength 190A may be 3.5±0.050 μm, the second laser wavelength 190B may be 4.0±0.050 μm, and the third laser wavelength 190C may be all wavelengths from about 3 μm up to about 5 μm after active IR system 100 removes first laser wavelength 190A and second laser wavelength 190B where the effective spectral region is about 1.8 μm; as such, the uniform laser wavelength 190C is wider and/or greater than the first laser wavelength 190A and the second laser wavelength 190B. Continuing with this instance, the cold filter 140 provides a lower temperature to create a lower background signal and/or energy than the cold filter 140 creating ambient temperature; as such, the inclusion of the cold filter 140 provides a background signal that is integrated across the about 1.8 μm spectral region.

With such reflection and transmission modes, both the first metamaterial filter 122 and the second metamaterial filter 124 are configured reflect and/or transmit the first laser wavelength 190A, the second laser wavelength 190B, and the third laser wavelength 190C to the at least one active camera 160 for image generation of the at least one remote object "RO" located in the far field. As such, the first metamaterial filter 122 and the second metamaterial filter 124 are also configured to spectrally combine the first laser wavelength 190A, the second laser wavelength 190B, and the third laser wavelength 190C prior to or at the at least one active camera for image generation of the at least one remote object "RO" located in the far field.

Figure 2:
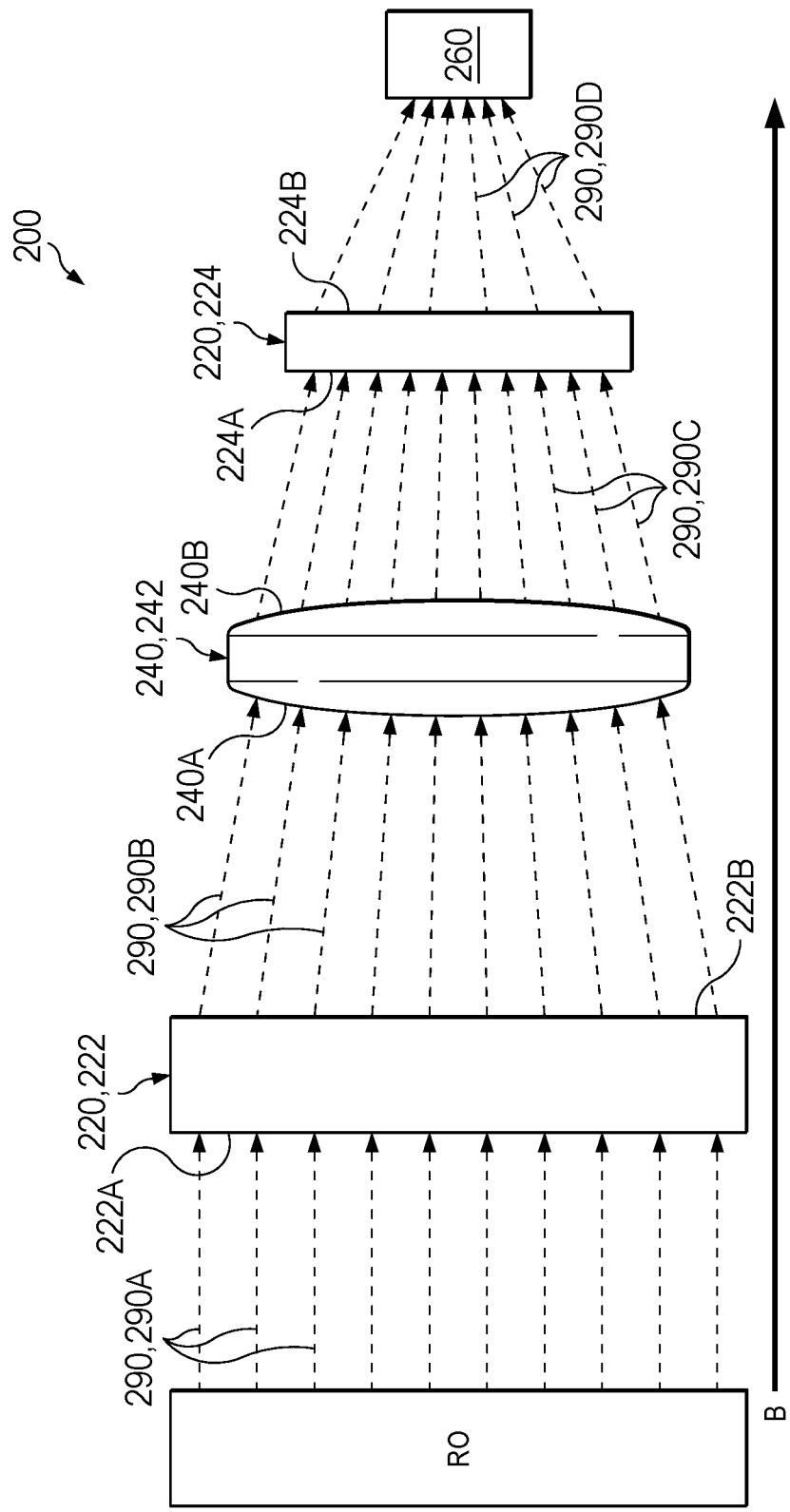
FIG. 2 is a schematic view of another active IR system according to another aspect of the present disclosure.

FIG. 2 illustrates another active IR system that is generally referred to 200. As described in more detail below, the active IR system 200 is configured to use at least two optical elements or a set of optical element formed of desired metamaterials that are designed to provide narrowband spectral filtering. Such components and elements that make up the active IR system 200 are described in more detail below. In this embodiment, however, active IR system 200 is configured to use at least one spectral filter or a set of spectral filters formed of desired metamaterials designed to provide narrowband spectral filtering.

As described above, active IR system 200 is configured to have at least two metamaterial filters 220 that are designed to provide narrowband spectral filtering of light reflected by at least one remote object "RO" in the far field. In one aspect, active IR system 200 includes a first metamaterial filter 222 configured to initially receive laser wavelengths (relative to direction arrow "B") reflected by at least one remote object "RO" in the far field. As best seen in FIG. 2, first metamaterial filter 222 includes a first surface 222A that faces in a first direction towards the at least one remote object "RO" in the far field. As described in more detail below, first metamaterial filter 222 may be designed with a first filter structure to reflect or block a first range of laser wavelengths reflected by the at least one remote object "RO" while transmitting at a second range of laser wavelengths through the first metamaterial filter 222. First metamaterial filter 222 also includes a second surface 222B that faces in a second direction opposite to the first direction of the first surface 222A and away from the at least one remote object "RO" in the far field.

In another aspect, active IR system 100 may include a second metamaterial filter 224 configured to receive laser wavelengths transmitted by the first metamaterial filter 222. As best seen in FIG. 2, second metamaterial filter 224 is positioned optically behind the first metamaterial filter 222 and optically aligned with the first metamaterial filter 222. Second metamaterial filter 224 includes a first surface 224A that faces in a first direction towards the at least one remote object "RO" in the far field and towards the first metamaterial filter 222. As described in more detail below, second metamaterial filter 224 may be designed with a second filter structure to reflect or block a second range of laser wavelengths reflected by the at least one remote object while transmitting at a third range of laser wavelengths through the second metamaterial filter 224. Second metamaterial filter 224 also includes a second surface 224B that faces in a second direction opposite to the first direction of the first surface 124A and away from the at least one remote object "RO" in the far field.

It should be understood that first metamaterial filter 222 may be formed of any suitable metamaterials that are configured to reflect specific background wavelengths (i.e., rejected portions of background energy or background blackbody emissions from an active camera) and to transmit specific laser wavelengths to an active camera dictated on the implementation of the first metamaterial filter 222. In one aspect, the first metamaterial filter 222 may be formed of a first metamaterial with the first filter structure for reflecting and/or block a first range of wavelengths from the active IR system 200 and for transmitting and/or sending a second range of laser wavelengths into the active IR system 200 for further filtering. Continuing this aspect, the first metamaterial filter 222 may be a bandpass filter that is highly angle-insensitive for filtering a wide range of wavelengths from the active IR system 200. In other exemplary embodiment, a first metamaterial filter provided in this specific active IR system may be any suitable filter dictated by the implementation of the active IR system. In one instance, a first metamaterial filter provided in this specific active IR system may be a low pass filter. In another instance, a first metamaterial filter provided in this specific active IR system may be a high pass filter.

It should also be understood that second metamaterial filter 224 may be formed of any suitable metamaterials that are configured to reflect specific wavelengths (i.e., rejected portions of background energy or background blackbody emissions from an active camera) and to transmit specific laser wavelengths to an active camera dictated on the implementation of the second metamaterial filter 224. In one aspect, the second metamaterial filter 224 may be formed of a second metamaterial with the second filter structure for reflecting and/or filtering a second range of wavelengths from the active IR system 200 and for transmitting and/or sending a third range of laser wavelengths into the active IR system 200. In another aspect, the second metamaterial filter 224 may include longwave-pass coating for filtering the second range of laser wavelengths to the third range of laser wavelengths and for removing background energy and/or unwanted energy from the surrounding scene. In another aspect, the second metamaterial filter 224 may include shortwave-pass coating for filtering the second range of laser wavelengths to the third range of laser wavelengths for removing background energy from the surrounding scene. In another aspect, the second metamaterial filter 224 may be a cold filter for filtering the second range of laser wavelengths to the third range of laser wavelengths for removing background energy from the surrounding scene.

In other exemplary embodiments, first and second metamaterial filters 222, 224 may be designed to any suitable configuration dictated by the implementation of active IR system 200. In one aspect, first and second metamaterial filters of an active IR system may be a combination of a shortwave pass filter and a longwave pass filter along with a narrow bandpass filter in the active IR system. In this instance, this configuration removes and/or blocks background energy or unwanted energy while keeping and emitting the light reflected by a remote object in the far field to an active camera in the active IR system.

Referring to FIG. 2, active IR system 200 includes a lens assembly 240 that is positioned between the first metamaterial filter 222 and the second metamaterial filter 224. As illustrated, lens assembly 240 includes a first end (generally referred to as 240A) that is positioned proximate to the first metamaterial filter 222 and faces towards the second surface 222B of the first metamaterial filter 222. Lens assembly 240 also includes a second end (generally referred to as 240B) that is positioned proximate to the second metamaterial filter 224 and faces towards the first surface 224A of the second metamaterial filter 224. The second end 240B of the lens assembly 240 is also positioned opposite to the first end 240A of the lens assembly 240.

It should be understood that lens assembly 240 may include at least one optical element 242 that is positioned between the first metamaterial filter 222 and the second metamaterial filter 224. The at least one optical element 242 of the lens assembly 240 is configured to receive the second range of laser wavelength transmitted from the first metamaterial filter 222. The at least one optical element 242 of lens assembly 240 is also configured to converge and/or diverge the second range of laser wavelengths from the first metamaterial filter 222 to the second metamaterial filter 224 as dictated by the implementation of the lens assembly 240. It should also be understood that the at least one optical element 242 may be any commercially available optical element for converging and/or diverging a second range of laser wavelengths received from a first metamaterial filter to a second metamaterial filter as dictated by the implementation of the lens assembly.

Still referring to FIG. 2, active IR system 200 may also include at least one active camera 260 that is positioned optically behind the first metamaterial filter 222, the second metamaterial filter 224, and the lens assembly 240. The at least one active camera 260 may be configured to detect and generate an image of the remote object formed from the laser wavelengths transmitted by the first metamaterial filter 222 and the second metamaterial filter 224. It should be understood that the at least one active camera 260 may be any suitable and commercially available active camera for detecting and generating an image of the remote object formed from the laser wavelengths reflected and transmitted by at least one metamaterial of an active IR system.

As illustrated in FIG. 2, the first metamaterial filter 222 and the second metamaterial filter 224 may be optically oriented at any suitable angle relative to the at least one active camera 260. In one aspect, the first metamaterial filter 222 is optically oriented at a first angle relative to the at least one active camera 260 where the first surface 222A is facing away from the at least one active camera 260 and the second surface 222B is facing towards the at least one active camera 260. Continuing with this aspect, the second metamaterial filter 224 is optically oriented at a second angle relative to the at least one active camera 260 where the first surface 224A is facing away from the at least one active camera 260 and the second surface 224B is facing towards the at least one active camera 260. In this aspect, the first angle and the second angle are equal to one another in that the first metamaterial filter 222 and the second metamaterial filter 224 are parallel with one another.

Generally, active IR system 200 may include a housing or similar structure containing each of the component described herein, as dictated by the desired implementation. Such housing is not shown in FIG. 2 but may be included in any suitable position, shape, form, and/or with any desired features, as dictated by the desired implementation.

Having now described the components and elements of active IR system 200, a method of using active IR system 200 is described in more detail below.

Upon operation of active IR system 200, first metamaterial filter 222 initially receives light 290 reflected from at least one remote object "RO" located in the far field. Particularly, the light 290 reflected from the at least one remote object "RO" initially interfaces with the first surface 222A of first metamaterial filter 222. In this example, light 290 includes a wide range of laser wavelengths or a first range of laser wavelengths 290A initially entering through the first surface 222A of the first metamaterial filter 222. In this embodiment, first metamaterial filter 222 includes a first filter structure and/or mode that is configured to reflect the first range of laser wavelengths 290A to a second range of laser wavelengths 290B based on the metamaterial forming first metamaterial filter 222. Stated differently, the first filter structure of the first metamaterial filter 222 is configured to reflect unwanted laser wavelengths from the first range of laser wavelengths 290A and to pass through desired laser wavelengths found in the second range of laser wavelengths 290B. In this operation, the second range of laser wavelengths 290B transmitted by the first metamaterial filter 222 includes narrowband laser wavelengths and/or desired polarization of laser wavelengths as compared to the first range of wavelengths 290A initially entered into first metamaterial filter 222.

Upon being transmitted from the first metamaterial filter 222, the second range of laser wavelengths 290B enters into the lens assembly 240. In this embodiment, the lens assembly 240 may be enabled to assist in enhancing and/or improving the second range of laser wavelengths 290B prior to being received by the at least one active camera 260. Such assistance in enhancing and/or improving the second range of laser wavelengths 290B may be dictated by the configuration and/or properties of the at least one optical element 242 of the lens assembly 240 as implemented in active IR system 200. While not illustrated herein, the lens assembly 240 be formed and/or include metamaterial for reflecting unwanted laser wavelengths from second range of laser wavelengths 290B.

Upon passing through the lens assembly 240, the second range of laser wavelengths 290B enters into the second metamaterial filter 224. Particularly, the second range of laser wavelengths 290B interfaces with the first surface 224A of second metamaterial filter 224. In this embodiment, second metamaterial filter 224 includes a second filter structure and/or mode that is configured to reflect the second range of laser wavelengths 290A to a third range of laser wavelengths 290C based on the metamaterial forming second metamaterial filter 224. Stated differently, the second filter structure of the second metamaterial filter 224 is configured to reflect unwanted laser wavelengths from the second range of laser wavelengths 290B and to pass through desired laser wavelengths found in the third range of laser wavelengths 290C. In this operation, the third range of laser wavelengths 290C transmitted by the second metamaterial filter 224 includes less laser wavelengths and/or desired polarization of laser wavelengths than the first range of wavelengths 290A initially entered into first metamaterial filter 222 and the second range of wavelengths 290B transmitted from the first metamaterial filter 222 and the lens assembly 240. Such reflection of the second range of laser wavelengths 290B and transmission of the third range of laser wavelengths 290C blocks and/removes a desired amount of background energy and/or noise from a scene surrounding the active IR system 200.

Figure 3:
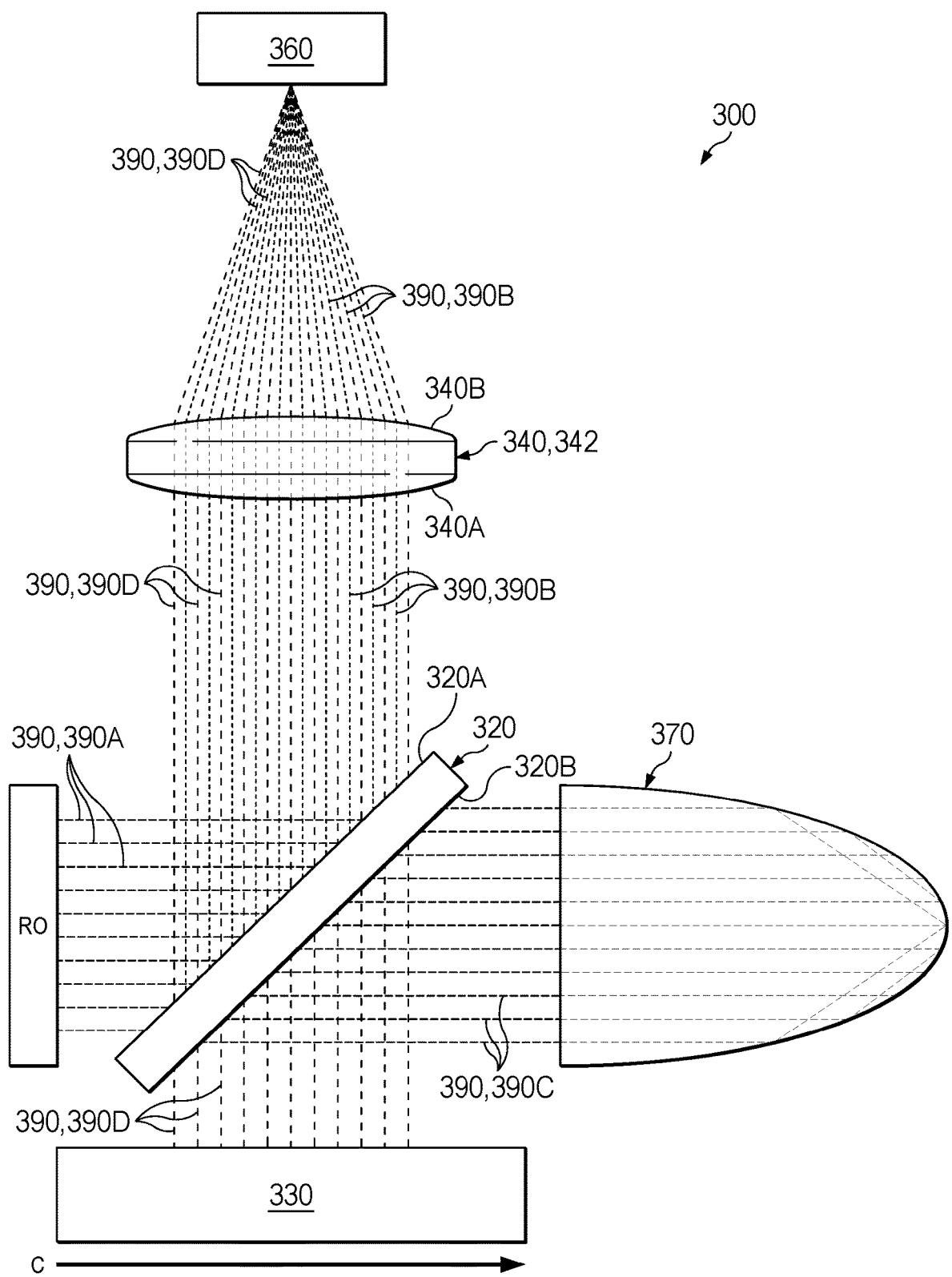
FIG. 3 is a schematic view of another active IR system according to another aspect of the present disclosure.

FIG. 3 illustrates another active IR system that is generally referred to 300. As described in more detail below, the active IR system 300 is configured to use at least one optical elements formed of one or more desired metamaterials that are designed to provide narrowband spectral filtering. Such components and elements that make up the active IR system 300 are described in more detail below. In this embodiment, however, active IR system 300 is configured to use at least one spectral filter formed of one or more desired metamaterials designed to provide narrowband spectral filtering.

As described above, active IR system 300 is configured to have at least one metamaterial filter 320 that is designed to provide narrowband spectral filtering of light reflected by at least one remote object "RO" in the far field. In one aspect, active IR system 300 includes a metamaterial filter 320 configured to initially receive laser wavelengths (relative to direction arrow "C") reflected by at least one remote object "RO" in the field. As best seen in FIG. 3, metamaterial filter 320 includes a first surface 320A that faces in a first direction towards the at least one remote object "RO" in the far field. As described in more detail below, metamaterial filter 320 may be designed with a first filter structure to reflect or filter a first range of laser wavelengths reflected by the at least one remote object while transmitting at a second range of laser wavelengths through the metamaterial filter 320. Metamaterial filter 320 also includes a second surface 320B that faces in a second direction opposite to the first direction of the first surface 320A and away from the at least one remote object "RO" in the far field.

It should be understood that metamaterial filter 320 may be formed of any suitable metamaterials that are configured to reflect specific laser wavelengths and transmit specific laser wavelengths dictated on the implementation of the metamaterial filter 320. In one aspect, the metamaterial filter 320 may be formed of a metamaterial with a filter structure for reflecting and/or filtering at least one range of laser wavelengths to a lens assembly of the active IR system 300, which is described in more detail below, and for transmitting and/or sending at least another range of laser wavelengths to beam removal element of the active IR system 300, which is also described in more detail below. In one aspect, the metamaterial filter 320 may be a narrowband metamaterial filter used to reflect at least one range of laser wavelengths to a lens assembly of the active IR system 300 while transmitting and/or sending at least another range of laser wavelengths to beam removal element of the active IR system 300. In another aspect, the metamaterial filter 320 may be a narrowband metamaterial filter used to reflect a first plurality of laser wavelengths to a lens assembly of the active IR system 300 while transmitting and/or sending a second plurality of laser wavelengths to beam removal element of the active IR system 300.

Still referring to FIG. 3, active IR system 300 may also include at least one cold plate 330 that is positioned optically below the metamaterial filter 320. The at least one cold plate 330 is configured to emit and/or provide uniform laser wavelength or low background noise to at least one active camera in the active IR system 300, which is described in more detail below. It should be understood that the at least one cold plate 330 may be any suitable and commercially available cold plate 330 for emitting and/or providing a uniform laser wavelength or low background noise to at least one active camera in an active IR system. In one aspect, cold plate 330 may also be formed of at least one metamaterial filter if dictated by the implementation of active IR system 300.

Referring to FIG. 3, active IR system 300 includes a lens assembly 340 that is positioned optically above the metamaterial filter 320 and the at least one cold plate 330. As illustrated, lens assembly 340 includes a first end (generally referred to as 340A) that is positioned proximate to the metamaterial filter 320 and faces towards the second surface 320B of the metamaterial filter 320. Lens assembly 340 also includes a second end (generally referred to as 340B) that is positioned away from and/or remote from the metamaterial filter 320 in active IR system 300 and faces away from the metamaterial filter 320. In this embodiment, the second end 340B of the lens assembly 340 is also opposite to the first end 340A of the lens assembly 340.

It should be understood that lens assembly 340 may include at least one optical element 342 that is positioned optically above the metamaterial filter 320. The at least one optical element 342 of the lens assembly 340 is configured to receive the second range of laser wavelength transmitted from the metamaterial filter 320. The at least one optical element 342 of lens assembly 340 is also configured to converge and/or diverge the second range of laser wavelengths from the metamaterial filter 320 to at least one active camera of the active IR system 300 as dictated by the implementation of the lens assembly 340. It should also be understood that the at least one optical element 342 of the lens assembly 340 may be any commercially available optical element for converging and/or diverging a second range of laser wavelengths received from a metamaterial filter to at least one active camera of an active IR system as dictated by the implementation of a lens assembly.

Still referring to FIG. 3, active IR system 300 may also include at least one active camera 360 that is positioned optically above the metamaterial filter 320, the at least one cold plate 330, and the lens assembly 340. The at least one active camera 360 may be configured to detect and generate an image of the remote object formed from the laser wavelengths reflected and transmitted by the metamaterial filter 320. It should be understood that the at least one active camera 360 may be any suitable and commercially available active camera for detecting and generating an image of the remote object formed from the laser wavelengths reflected and transmitted by at least one metamaterial filter of an active IR system.

Still referring to FIG. 3, active IR system 300 may also include at least one beam removal element or beam dump element 370 positioned optically behind the metamaterial filter 320 and optically aligned with the metamaterial filter 320. The at least one beam removal element 370 is also positioned away from the at least one cold plate 330, lens assembly 340, and that the at least one active camera 360 in that the at least one beam removal element 370 is free from being optically aligned with the at least one cold plate 330, lens assembly 340, and that the at least one active camera 360. The at least one beam removal element 370 is configured to receive a third range of laser wavelengths or background energy that passes through the metamaterial filter 320. As such, the at least one beam removal element 370 retains and/or removes the third range of laser wavelengths or background energy such that the third range of laser wavelengths fails to be directed to the at least one active camera 360 to minimize background noise and to maximize specific signal-to-noise ratio, which is described in more detail below. It should be understood that the at least one beam removal element 370 may be any suitable and commercially available beam removal element for retaining and/or removing a third range of laser wavelengths or background energy such that the third range of laser wavelengths fails to be directed to at least one active camera.

As illustrated in FIG. 3, the metamaterial filter 320 may be optically oriented at any suitable angle relative to the at least one active camera 360. In one aspect, the metamaterial filter 320 is optically oriented relative to the at least one active camera 360 where the first surface 320A is facing in a direction towards the at least one active camera 360 and the second surface 320B is facing in a direction away from the at least one active camera 360.

Generally, active IR system 300 may include a housing or similar structure containing each of the component described herein, as dictated by the desired implementation. Such housing is not shown in FIG. 3 but may be included in any suitable position, shape, form, and/or with any desired features, as dictated by the desired implementation.

The configuration of metamaterial filter 320 is considered advantageous at least because the metamaterial provides options to optimize the active IR system 300 as dictated by the implementation of the active IR system 300 compared to other conventional optical elements and techniques, including coatings and gratings. Particularly, the use of metamaterials enables designers of the active IR system 300 to optimize the metamaterial filter 320 based on the desired wavelengths, desired polarization, and the desired angle of incidence.

Having now described the components and elements of active IR system 300, a method of using active IR system 300 is described in more detail below.

Upon operation of active IR system 300, metamaterial filter 320 initially receives light 390 reflected from at least one remote object "RO" located in the far field. Particularly, the light 390 reflected from the at least one remote object "RO" initially interfaces with the first surface 320A of metamaterial filter 320. In this example, light 390 includes a wide range of laser wavelengths or a first range of laser wavelengths 390A initially entering through the first surface 320A of the metamaterial filter 320. In this embodiment, the first range of laser wavelengths 390A of light 390 also defines first angles of incidence in which the first angles of incidence are unaffected and/or reflected until reaching the metamaterial filter 320.

In this embodiment, metamaterial filter 320 includes a filter structure that is configured to reflect the first range of laser wavelengths 390A to a second range of laser wavelengths 390B to the lens assembly 340 based on the metamaterial forming metamaterial filter 320 while transmitting a third range of laser wavelength 390C to the beam removal element 370. Stated differently, the filter structure of the metamaterial filter 320 is configured to reflect desired laser wavelengths from the first range of laser wavelengths 390A to the lens assembly 340 (i.e., second range of laser wavelengths 390B) while allowing unwanted laser wavelengths and/or background energy (i.e., third range of laser wavelengths 390C) to pass through to the beam removal element 370. In this operation, the second range of laser wavelengths 390B transmitted by the metamaterial filter 320 includes less laser wavelengths and/or smaller amount of laser wavelengths than the first range of wavelengths 390A initially entered into metamaterial filter 320. It should also be noted that the filter structure of the metamaterial filter 320 is configured to reflect and transmits the light 390 having first angles of incidence where the light 390 is unimpeded and/or unaffected until light 390 reaches metamaterial filter 320.

Upon being transmitted from the metamaterial filter 320, the second range of laser wavelengths 390B enters into the lens assembly 340. In this embodiment, the lens assembly 340 may be enabled to assist in enhancing and/or improving the second range of laser wavelengths 390B prior to being received by the at least one active camera 360. Such assistance in enhancing and/or improving the second range of laser wavelengths 390B may be dictated by the configuration and/or properties of the at least one optical element 342 of the lens assembly 340 as implemented in active IR system 300. While not illustrated herein, the lens assembly 340 be formed and/or include metamaterial for reflecting unwanted laser wavelengths from second range of laser wavelengths 390B.

Moreover, the at least one cold plate 330 also emits low background noise 390D to the at least one active camera 360 in the active IR system 300. As best seen in FIG. 3, the fourth range of laser wavelength 290D transmits and/or passes through the metamaterial filter 320 at the second surface 320B and exits through the first surface 320A based on the metamaterial structure forming the metamaterial filter 320. The fourth range of wavelengths 390D continues to pass through the lens assembly 340 and is ultimately received by the at least one active camera 360. It should be understood that the emission of the fourth range of wavelengths 390D by the at least one cold plate 330 may be emitted continuously as the metamaterial filter 320 is reflecting the light 390 to the at least one active camera 360.

Figure 4:
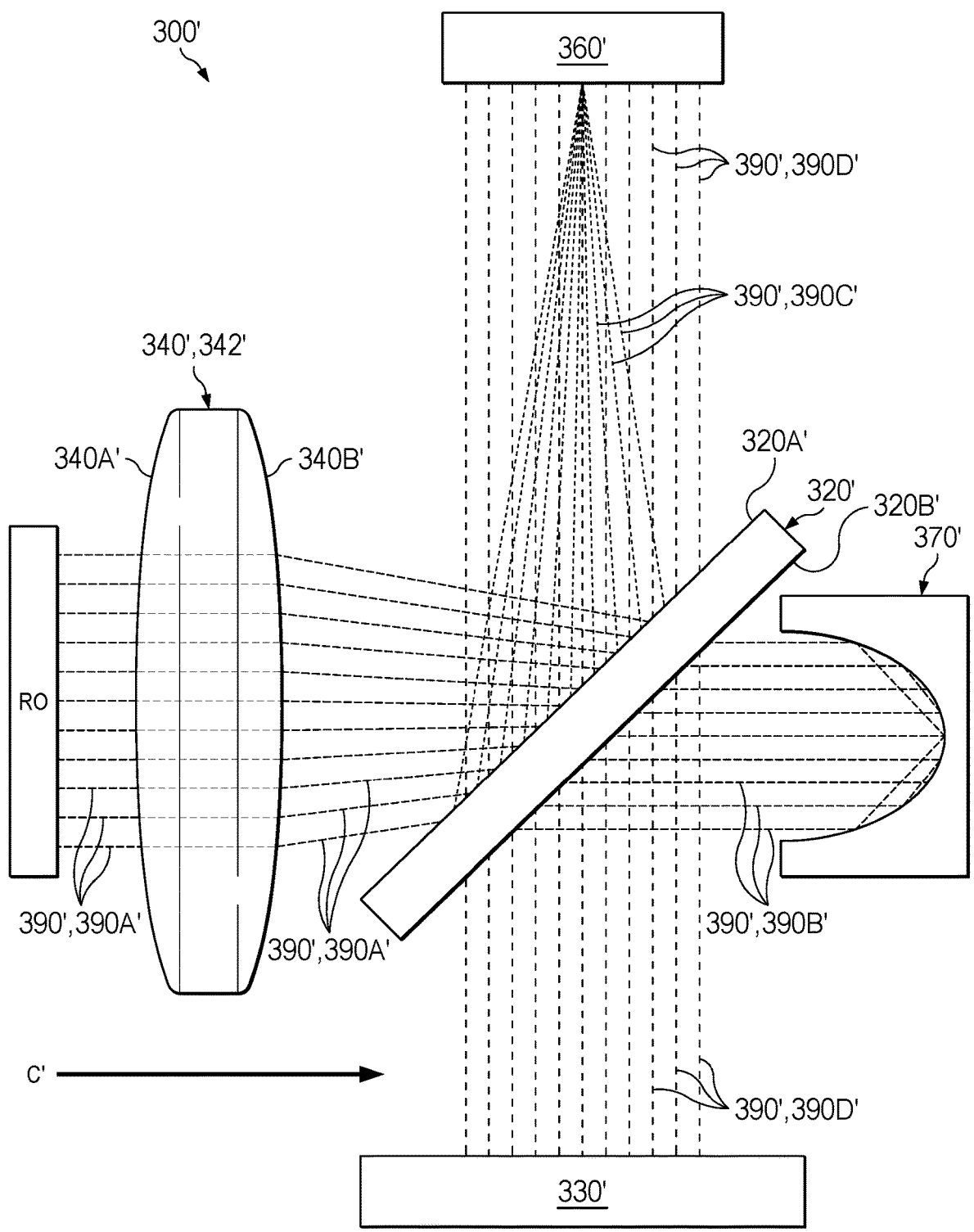
FIG. 4 is a schematic view of an alternative active IR system that is similar to the active IR system illustrated in FIG. 3.

FIG. 4 illustrates another active IR system that is generally referred to 300'. Active IR system 300' is also substantially similar to active IR system 300 described above and illustrated in FIG. 3, except as detailed below.

As described above, active IR system 300' is configured to have at least one metamaterial filter 320' that is designed to provide narrowband spectral filtering of light reflected by at least one remote object "RO" in the far field. In one aspect, active IR system 300' includes a metamaterial filter 320' configured to receive laser wavelengths reflected by at least one remote object "RO" in the field. As best seen in FIG. 4, metamaterial filter 320' includes a first surface 320A' that faces in a first direction towards the at least one remote object "RO" in the far field. As described in more detail below, metamaterial filter 320' may be designed with a filter structure to reflect or filter a first range of laser wavelengths reflected by the at least one remote object while transmitting at a second range of laser wavelengths through the metamaterial filter 320'. Metamaterial filter 320' also includes a second surface 320B' that faces in a second direction opposite to the first direction of the first surface 320A' and away from the at least one remote object "RO" in the far field.

It should be understood that metamaterial filter 320' may be formed of any suitable metamaterials that are configured to reflect specific laser wavelengths and transmit specific laser wavelengths dictated on the implementation of the metamaterial filter 320'. In one aspect, the metamaterial filter 320' may be formed of a metamaterial with a filter structure for reflecting and/or filtering at least one range of laser wavelengths to a lens assembly of the active IR system 300', which is described in more detail below, and for transmitting and/or sending at least another range of laser wavelengths to beam removal element of the active IR system 300', which is also described in more detail below. In one aspect, the metamaterial filter 320' may be a narrowband metamaterial filter used to reflect at least one range of laser wavelengths to a lens assembly of the active IR system 300' while transmitting and/or sending at least another range of laser wavelengths to beam removal element of the active IR system 300'. In another aspect, the metamaterial filter 320' may be a narrowband metamaterial filter used to reflect a first plurality of laser wavelengths to a lens assembly of the active IR system 300' while transmitting and/or sending a second plurality of laser wavelengths to beam removal element of the active IR system 300'.

Still referring to FIG. 4, active IR system 300' may also include at least one cold plate 330' that is positioned optically below the metamaterial filter 320'. The at least one cold plate 330' is configured to emit and/or provide uniform laser wavelength or low background noise to at least one active camera in the active IR system 300', which is described in more detail below. It should be understood that the at least one cold plate 330' may be any suitable and commercially available cold plate 330' for emitting and/or providing a uniform laser wavelength or low background noise to at least one active camera in an active IR system.

Referring to FIG. 4, active IR system 300' includes a lens assembly 340'. In this embodiment, however, lens assembly 340' is positioned optically ahead of and/or in front of the metamaterial filter 320' and the at least one cold plate 330'. With such configuration of active IR system 300', lens assembly 340' initially receives light reflected from the at least one remote object "RO" positioned in the far field (relative to direction arrow C'). As illustrated, lens assembly 340' includes a first end (generally referred to as 340A') that is positioned away from the metamaterial filter 320' and faces away from the first surface 320A' of the metamaterial filter 320'. Lens assembly 340' also includes a second end (generally referred to as 3408') that is positioned proximate to the metamaterial filter 320' and faces towards the first surface 320A' of the metamaterial filter 320'. In this embodiment, the second end 340B' of the lens assembly 340' is also opposite to the first end 340A' of the lens assembly 340'.

Such structural configuration of the metamaterial filter 320' and the lens assembly 340' is considered advantageous at least because this structural configuration provides a smaller and more compact architecture of the active IR system 300' in comparison to active IR system 300 discussed above. In this configuration, however, the metamaterial filter 320 is configured to reflect second angles of incidence from laser wavelengths due to the laser wavelengths initially passing through the lens assembly 340'. In this configuration, the second angles of incidence defined by the laser wavelengths are greater than the first angles of incidence defined by the laser wavelengths mentioned previously in active IR system 300 Moreover, the architecture of active IR system 300' may increase the spectral bandpass (or decreases sensitivity) of the metamaterial filter 320', or the architecture of active IR system 300' may increase the focal point ratio of the lens assembly 340' (i.e., utilizing substantially large pixels). In one aspect, a lens assembly of an active IR system described herein may include 1550 nanometer Geiger-mode avalanche photodiodes (GmAPDs).

It should be understood that the structural configuration of the metamaterial filter 320' differs from the structural configuration of the metamaterial filter 320 of active IR system 300 as discussed above. In this particular embodiment, the metamaterial forming the metamaterial filter 320' is designed and fabricated to handle a large range of incident angles and/or laser wavelengths once passing through the lens assembly 340. As best seen in FIG. 4, the lens assembly 340' steers and/or affects light reflected by a remote object prior to incidental angles prior to the light interfacing with the metamaterial filter 320'. With such steering of the light by the lens assembly 340', the metamaterial filter 320' is configured to reflect a wider range of laser wavelengths oriented at various incidental angles upon passing through the lens assembly 340'. In comparison to active IR system 300, light interfacing with the metamaterial filter 320 was unaffected and/or lacking incident angling since the metamaterial filter 320 initially interfaces with the light reflected by a remote object. With such difference, the metamaterial filter 320 is designed and fabricated to handle a smaller range of incident angles and/or laser wavelengths.

It should be understood that lens assembly 340' may include at least one optical element 342' that is positioned optically ahead of and/or in front of the metamaterial filter 320'. The at least one optical element 342' of the lens assembly 340' is configured to initially receive light reflected from a remote object located in the far field. The at least one optical element 342' of lens assembly 340' is also configured to converge and/or diverge the light reflected from the remote object to the metamaterial filter 320' as compared to the at least one optical element 342 of the lens assembly 340 described above. It should also be understood that the at least one optical element 342' of the lens assembly 340' may be any commercially available optical element for converging and/or diverging light reflected from the remote object to the metamaterial filter 320' of active IR system 300'

Still referring to FIG. 4, active IR system 300' may also include at least one active camera 360' that is positioned optically above the metamaterial filter 320', the at least one cold plate 330', and the lens assembly 340'. The at least one active camera 360' may be configured to detect and generate an image of the remote object formed from the laser wavelengths reflected and transmitted by the metamaterial filter 320'. It should be understood that the at least one active camera 360' may be any suitable and commercially available active camera for detecting and generating an image of the remote object formed from the laser wavelengths reflected and transmitted by at least one metamaterial filter of an active IR system.

Still referring to FIG. 4, active IR system 300' may also include at least one beam removal element or beam dump element 370' positioned optically behind the metamaterial filter 320' and the lens assembly 340' along with being optically aligned with the metamaterial filter 320' and the lens assembly 340'. The at least one beam removal element 370' is also positioned away from the at least one cold plate 330' and that the at least one active camera 360' in that the at least one beam removal element 370' is free from being optically aligned with the at least one cold plate 330' and that the the at least one active camera 360'. The at least one beam removal element 370' is configured to receive a third range of laser wavelengths or background energy that passes through the metamaterial filter 320'. As such, the at least one beam removal element 370' retains and/or removes the third range of laser wavelengths or background energy such that the third range of laser wavelengths fails to be directed to the at least one active camera 360'. It should be understood that the at least one beam removal element 370' may be any suitable and commercially available beam removal element for retaining and/or removing a third range of laser wavelengths or background energy such that the third range of laser wavelengths fails to be directed to at least one active camera.

As illustrated in FIG. 4, the metamaterial filter 320' may be optically oriented at any suitable angle relative to the lens assembly 340' and/or the at least one active camera 360'. In one aspect, the metamaterial filter 320' may be optically oriented relative to the at least one active camera 360' where the first surface 320A' is facing in a direction towards the at least one active camera 360 and the second surface 320B' is facing in a direction away from the at least one active camera 360. In another aspect, the metamaterial filter 320' may also be optically oriented relative to the lens assembly 340' where the first surface 320A' is facing in a direction towards the second end 340B' of the lens assembly 340 and the second surface 320B' is facing in a direction away from the lens assembly 340'.

Generally, active IR system 300 may include a housing or similar structure containing each of the component described herein, as dictated by the desired implementation. Such housing is not shown in FIG. 3 but may be included in any suitable position, shape, form, and/or with any desired features, as dictated by the desired implementation.

Having now described the components and elements of active IR system 300', a method of using active IR system 300' is described in more detail below.

Upon operation of active IR system 300', lens assembly 340' initially receives light 390' (relative to direction arrow "C'") reflected from at least one remote object "RO" located in the far field. Particularly, the light 390' reflected from the at least one remote object "RO" initially interfaces with the first end 340A' of lens assembly 340'. In this example, light 390' includes a wide range of laser wavelengths or a first range of laser wavelengths 390A' initially entering through the first end 340A' of the lens assembly 340'. In this embodiment, the lens assembly 340' may be enabled to assist in enhancing and/or improving the first range of laser wavelengths 390A' prior to being received by the at least one active camera 360'. Such assistance in enhancing and/or improving the first range of laser wavelengths 390A' may be dictated by the configuration and/or properties of the at least one optical element 342' of the lens assembly 340' as implemented in active IR system 300'. While not illustrated herein, the lens assembly 340' be formed and/or include metamaterial for reflecting unwanted laser wavelengths from first range of laser wavelengths 390A'.

Upon being passed through the lens assembly 340', metamaterial filter 320' receives the first range of laser wavelengths 390A' of light 390' reflected from at least one remote object "RO" located in the far field. Particularly, the first range of laser wavelengths 390A' of light 390' reflected from the at least one remote object "RO" interfaces with the first surface 320A' of metamaterial filter 320'. In this embodiment, metamaterial filter 320' includes a filter structure that is configured to reflect the first range of laser wavelengths 390A' to a second range of laser wavelengths 390B' to the at least one active camera 360' based on the metamaterial forming metamaterial filter 320' while transmitting a third range of laser wavelength 390C' to the beam removal element 370'. Stated differently, the filter structure of the metamaterial filter 320' is configured to reflect desired laser wavelengths from the first range of laser wavelengths 390A' to the lens assembly 340' (i.e., second range of laser wavelengths 390B') while allowing unwanted laser wavelengths and/or background energy (i.e., third range of laser wavelengths 390C') to pass through to the beam removal element 370'. In this operation, the second range of laser wavelengths 390B' transmitted by the metamaterial filter 320' includes less laser wavelengths and/or smaller amount of laser wavelengths than the first range of wavelengths 390A' initially entered into metamaterial filter 320'.

Moreover, the at least one cold plate 330' also emits and/or provides a fourth range of laser wavelengths or low background noise 390D to the at least one active camera 360' in the active IR system 300'. As best seen in FIG. 4, the fourth range of laser wavelength 390D' transmits and/or passes through the metamaterial filter 320' at the second surface 320B' and exits through the first surface 320A' based on the metamaterial structure forming the metamaterial filter 320'. The fourth range of laser wavelengths 390D' continues to pass through the lens assembly 340' and is ultimately received by the at least one active camera 360'. It should be understood that the emission of the fourth range of laser wavelengths 390D' by the at least one cold plate 330' may be emitted continuously as the metamaterial filter 320' is reflecting the light 390' to the at least one active camera 360'.

Figure 5A:
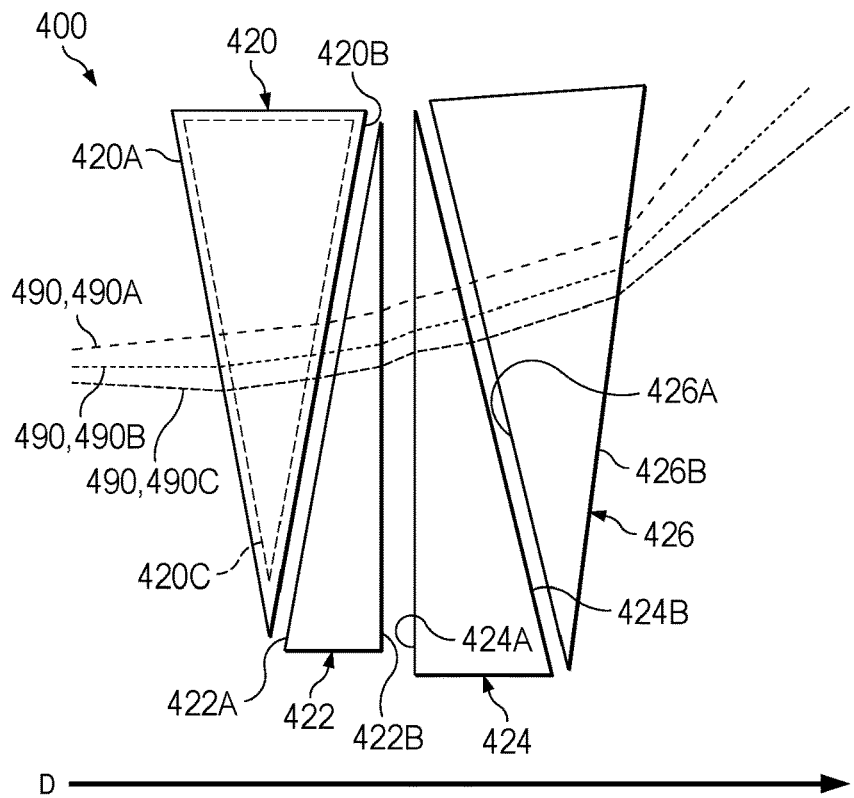
FIG. 5A is a schematic view of another active IR system according to another aspect of the present disclosure.

FIG. 5A illustrates another active IR system that is generally referred to 400. As described in more detail below, the active IR system 400 is configured to use at least one optical element and/or a set of optical elements formed of a desired metamaterial that is designed to provide compact steering of at least two laser wavelengths or laser beams. Such components and elements that make up the active IR system 400 are described in more detail below.

As described above, active IR system 400 is configured to have at least one metamaterial element or wedge 520 that is designed to provide achromatic beam steering and/or wavelength steering of light reflected by at least one remote object "RO" in the far field. In one aspect, active IR system 400 includes a first optical element 420 configured to provide achromatic beam steering and/or wavelength steering of light reflected by at least one remote object in the far field. As best seen in FIG. 5A, first optical element 420 includes a first surface 420A that faces in a first direction towards the at least one remote object in the far field. First optical element 420 also includes a second surface 420B that faces in a second direction opposite to the first direction of the first surface 420A and away from the at least one remote object in the far field. As described in more detail below, first optical element 420 may be designed with at least one metamaterial structure 420C on or both of first surface 420A and the second surface 42B to steer at least two laser wavelengths or beams reflected by at least one remote object at a desired angle.

It should be understood that first optical element 420 may be formed of any suitable metamaterials that are configured to provide achromatic beam steering and/or wavelength steering of light reflected by at least one remote object in the far field dictated on the implementation of the first optical element 420. In one aspect, the first optical element 420 may be formed of a metamaterial structure for achromatically steering laser wavelengths and/or beams at a desired angle relative to one or both of the first surface 420A and the second surface 420B. In another aspect, the first optical element 420 may be a narrowband metamaterial element provided with at least two narrowband active channels for steering purposes. In another aspect, the first optical element 420 may be a broadband metamaterial element provided with at least two broadband active channels for steering purposes.

As illustrated in FIG. 5A, the active IR system 400 includes standard and/or commercially available steering optical wedges for compact beam steering. In one instance, active IR system 400 may include a second optical element 422 that is positioned optically behind the first optical element 420. Similar to the first optical element 420, the second optical element 422 is configured to provide achromatic beam steering and/or wavelength steering of light reflected by at least one remote object in the far field. As best seen in FIG. 5A, second optical element 422 includes a first surface 422A that faces in a first direction towards the first optical element 420. Second optical element 422 also includes a second surface 422B that faces in a second direction opposite to the first direction of the first surface 422A and away from the first optical element 420. Similar to the first optical element 420, second optical element 422 may be designed to steer at least two laser wavelengths or beams reflected by at least one remote object at a desired angle without use of metamaterial.

In another instance, active IR system 400 may also include a third optical element 424 that is positioned optically behind the first optical element 420 and the second optical element 422. Similar to the first optical element 420, the third optical element 424 is configured to provide achromatic beam steering and/or wavelength steering of light reflected by at least one remote object in the far field. As best seen in FIG. 5A, third optical element 424 includes a first surface 424A that faces in a first direction towards the second optical element 422. Third optical element 424 also includes a second surface 424B that faces in a second direction opposite to the first direction of the first surface 424A and away from the second optical element 422. Similar to the second optical element 422, third optical element 424 may be designed to steer at least two laser wavelengths or beams reflected by at least one remote object at a desired angle without use of metamaterial.

In another instance, active IR system 400 may also include a fourth optical element 426 that is positioned optically behind the first optical element 420, the second optical element 422, and the third optical element 424. Similar to the first optical element 420, the fourth optical element 426 is configured to provide achromatic beam steering and/or wavelength steering of light reflected by at least one remote object in the far field. As best seen in FIG. 5A, fourth optical element 426 includes a first surface 426A that faces in a first direction towards the third optical element 424. Fourth optical element 426 also includes a second surface 426B that faces in a second direction opposite to the first direction of the first surface 426A and away from the third optical element 424. Similar to the second optical element 422 and the third optical element 424, fourth optical element 426 may be designed to steer at least two laser wavelengths or beams reflected by at least one remote object at a desired angle without use of metamaterial.

Figure 5B:
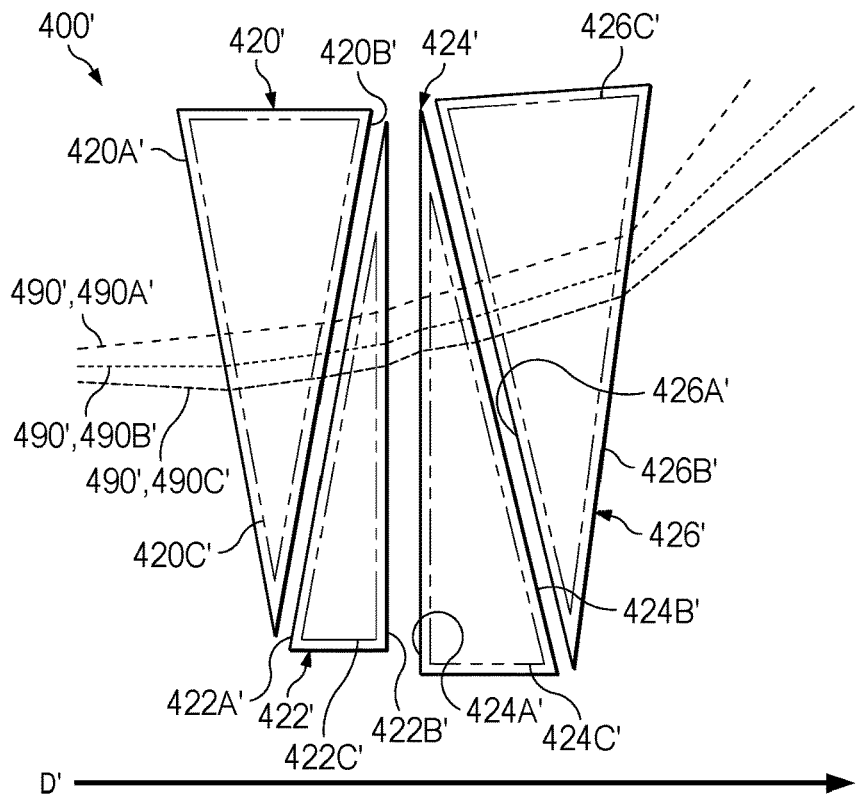
FIG. 5B is a schematic view of an alternative active IR system that is similar to the active IR system illustrated in FIG. 5A.

It should be understood that while only a single optical element is formed of metamaterial, one or more of the second optical element 422, the third optical element 424, and the fourth optical element 426 may include metamaterial as dictated by an implementation of active IR system. As illustrated in FIG. 5B, an active IR system 400' alternative to active IR system 400 includes one or more of a first optical element 420', a second optical element 422', a third optical element 424', and a fourth optical element 426' including metamaterial for steering at least two laser wavelengths or beams reflected by at least one remote object at a desired angle. Such implementation of metamaterial in active IR system 400' is described in more detail below.

In one aspect, active IR system 400' includes a first optical element 420' configured to provide achromatic beam steering and/or wavelength steering of light reflected by at least one remote object in the far field. As best seen in FIG. 5B, first optical element 420' includes a first surface 420A' that faces in a first direction towards the at least one remote object in the far field. First optical element 420' also includes a second surface 420B' that faces in a second direction opposite to the first direction of the first surface 420A' and away from the at least one remote object in the far field. First optical element 420' may be designed with at least one metamaterial structure 420C' on or both of first surface 420A' and the second surface 420B' to steer at least two laser wavelengths or beams reflected by at least one remote object at a desired angle.

It should be understood that first optical element 420' may be formed of any suitable metamaterials that are configured to provide achromatic beam steering and/or wavelength steering of light reflected by at least one remote object in the far field dictated on the implementation of the first optical element 420'. In one aspect, the first optical element 420' may be formed of a metamaterial structure for achromatically steering laser wavelengths and/or beams at a desired angle relative to one or both of the first surface 420A' and the second surface 420B'. In another aspect, the first optical element 420' may be a narrowband metamaterial element provided with at least two narrowband active channels for steering purposes. In another aspect, the first optical element 420' may be a broadband metamaterial element provided with at least two broadband active channels for steering purposes.

As illustrated in FIG. 5B, active IR system 400' may include first optical element 420' that is substantially similar to first optical element 420 of active IR system 400 described above. As such, first optical element 420' is formed of metamaterial to reduce weight and overall size as compared to previous uses of wedges in these types of systems.

As illustrated in FIG. 5B, active IR system 400' may also include a second optical element 422' that is positioned optically behind the first optical element 420'. Similar to the first optical element 420', the second optical element 422' is formed of metamaterial and is configured to provide achromatic beam steering and/or wavelength steering of light reflected by at least one remote object in the far field. By being formed of metamaterial, the weight and the size of the second optical element 422' may be reduced in comparison to previous conventionally wedges used in these types of systems, particularly second optical element 422. As best seen in FIG. 5B, second optical element 422' includes a first surface 422A' that faces in a first direction towards the first optical element 420'. Second optical element 422' also includes a second surface 4228' that faces in a second direction opposite to the first direction of the first surface 422A' and away from the first optical element 420'. Similar to the first optical element 420', second optical element 422' may be designed to steer at least two laser wavelengths or beams reflected by at least one remote object at a desired angle with use of metamaterial 422C'.

In another instance, active IR system 400' may also include a third optical element 424' that is positioned optically behind the first optical element 420' and the second optical element 422'. Similar to the first optical element 420', the third optical element 424' is also formed of metamaterial and is configured to provide achromatic beam steering and/or wavelength steering of light reflected by at least one remote object in the far field. By being formed of metamaterial, the weight and the size of the third optical element 424' may be reduced in comparison to previous conventionally wedges used in these types of systems, particularly third optical element 424. As best seen in FIG. 5B, third optical element 424' includes a first surface 424A' that faces in a first direction towards the second optical element 422'. Third optical element 424' also includes a second surface 4248' that faces in a second direction opposite to the first direction of the first surface 424A' and away from the second optical element 422'. Similar to the second optical element 422', third optical element 424' may be designed to steer at least two laser wavelengths or beams reflected by at least one remote object at a desired angle with use of metamaterial 424C'.

In another instance, active IR system 400' may also include a fourth optical element 426' that is positioned optically behind the first optical element 420', the second optical element 422', and the third optical element 424'. Similar to the first optical element 420', the fourth optical element 426' is also formed of metamaterial and is configured to provide achromatic beam steering and/or wavelength steering of light reflected by at least one remote object in the far field. By being formed of metamaterial, the weight and the size of the fourth optical element 426' may be reduced in comparison to previous conventionally wedges used in these types of systems, particularly fourth optical element 426. As best seen in FIG. 5B, fourth optical element 426' includes a first surface 426A' that faces in a first direction towards the third optical element 424'. Fourth optical element 426' also includes a second surface 426B' that faces in a second direction opposite to the first direction of the first surface 426A' and away from the third optical element 424'. Similar to the second optical element 422' and the third optical element 424', fourth optical element 426' may be designed to steer at least two laser wavelengths or beams reflected by at least one remote object at a desired angle with use of metamaterial 426C'.

While each of the first optical element 420', second optical element 422', the third optical element 424', are fourth optical element 426' define a triangular cross-section and/or wedge-shaped cross section, first optical element 420', second optical element 422', the third optical element 424', are fourth optical element 426' may define any suitable cross-section based on the desired implementation, including the shape, size, and configuration of the active IR system 400'.

Generally, active IR systems 400, 400' may also include other components and elements for enhancing and generating an image of the remote object. Examples of suitable and elements for enhancing and generating an image of the remote object include, but are not limited to, at least one lens assembly, at least one cold filter, at least one active camera, and other suitable components and elements described herein for an active IR system or other components and elements conventionally used in available active IR systems.

Generally, active IR systems 400, 400' may include a housing or similar structure containing each of the component described herein, as dictated by the desired implementation. Such housing is not shown in FIGS. 5A-5B but may be included in any suitable position, shape, form, and/or with any desired features, as dictated by the desired implementation.

Having now described the components and elements of active IR system 400, 400', methods of using active IR systems 400, 400' are described in more detail below. As illustrated in FIGS. 5A and 5B, light 490, 490' includes at least three laser wavelengths 490A, 490A', 4906, 490B', 490C, 490C' that are steered by the active IR system 400, 400'.

Upon operation of active IR system 300, metamaterial filter 320 initially receives light 490, 490' reflected from at least one remote object located in the far field. Particularly, the light 490, 490' reflected from the at least one remote object initially interfaces with the first surface 420A, 420A' of first optical element 420, 420'. In this example, light 490, 490' includes at least two laser wavelengths or beams initially entering through the first surface 420A, 420A' of first optical element 420, 420'. In this embodiment, first optical element 420, 420' includes a first structure with metamaterial that is configured to steer the light 490, 490' as the light 490, 490' interfaces with the first surface 420A, 420A'. As seen in FIG. 5A, the first surface 420A, 420A' steers the light 490, 490' from a first angle to a second angle relative to the first surface 420A, 420A' of the first optical element 420, 420' where the second angle of the light 490, 490' is greater than the first angle of the light 490, 490'

As the light 490, 490' exits from the first optical element 420, 420' at the second surface 4208, 420B', the light 490, 490' then interfaces with the first surface 422A, 422A' of the second optical element 422. Upon traveling between the first optical element 420, 420' and the second optical element 422, 422', the light 490, 490' is also steered from the second angle to a third angle measured relative to the first surface 422A' as the light 490, 490' travels from the second surface 420B, 4206' of the first optical element 420, 420' to the first surface 422A, 422A' of the second optical element 422, 422'. In this example, the third angle of the light 490, 490' is greater than the second angle of the light 490, 490'.

As the light 490, 490' exits from the second optical element 422, 422' at the second surface 422B, 422B', the light 490, 490' then interfaces with the first surface 424A, 424A' of the third optical element 424. Upon traveling between the second optical element 422, 422' and the third optical element 424, 424', the light 490, 490' is also steered from the third angle to a fourth angle measured relative to the first surface 424A' as the light 490, 490' travels from the second surface 422B, 422B' of the second optical element 422, 422' to the first surface 424A, 424A' of the third optical element 424, 424'. In this example, the fourth angle of the light 490, 490' is greater than the third angle of the light 490, 490'.

As the light 490, 490' exits from the third optical element 424, 424' at the second surface 4246, 424B', the light 490, 490' then interfaces with the first surface 426A, 426A' of the fourth optical element 426. Upon traveling between the third optical element 424, 424' and the fourth optical element 426, 426', the light 490, 490' is also steered from the fourth angle to a fifth angle measured relative to the first surface 426A' as the light 490, 490' travels from the second surface 424B, 424B' of the third optical element 424, 424' to the first surface 426A, 426A' of the fourth optical element 426, 426'. In this example, the fifth angle of the light 490, 490' is greater than the third angle of the light 490, 490'.

Once the light exits the fourth optical element 426, 426', the light 490, 490' may be reflected to other component and elements provided in the active IR system 400, 400', including, but are not limited to, at least one lens assembly, at least one cold filter, at least one active camera, and other suitable components and elements described herein for an active IR system or other components and elements conventionally used in available active IR systems.

Figure 6:
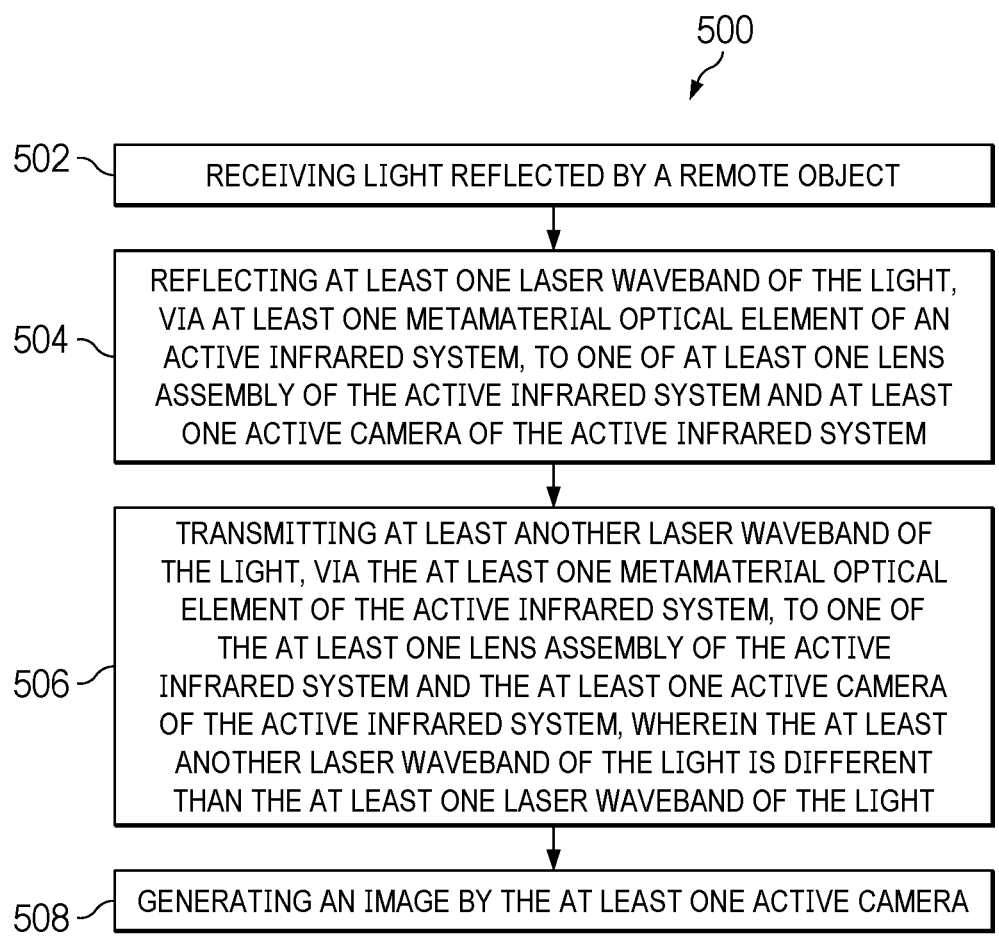
FIG. 6 is a flowchart of a method according to one aspect of the present disclosure.

FIG. 6 illustrates a method 500. An initial step 502 of method 500 may include receiving a light reflected by a remote object. Another step 504 of method 500 may include reflecting at least one laser waveband of the light, via at least one metamaterial optical element of an active infrared system, to one of at least one lens assembly of the active infrared system and at least one active camera of the active infrared system. Another step 506 of method 500 may include transmitting at least another laser waveband of the light, via the at least one metamaterial optical element of the active infrared system, to one of the at least one lens assembly of the active infrared system and the at least one active camera of the active infrared system, wherein the at least another laser waveband of the light is different than the at least one laser waveband of the light. Another step 508 of method 500 may include generating an image by the at least one active camera.

Optional steps and/or additional steps may be further included in method 500. This exemplary embodiment or another exemplary embodiment may further include that the step of reflecting the at least one laser waveband of the light further comprises: reflecting a first laser waveband of the light of the remote object, via a first metamaterial optical element of the active infrared system, to one of the at least one lens assembly of the active infrared system and the at least one active camera of the active infrared system; and reflecting a second laser waveband of the light of the remote object, via a second metamaterial optical element of the active infrared system, to one of the at least one lens assembly of the active infrared system and the at least one active camera of the active infrared system. This exemplary embodiment or another exemplary embodiment may further include a step of emitting a uniform background light by at least one cold plate of the active infrared system; and wherein the step transmitting the at least another laser waveband of the light further comprises: transmitting the uniform background light, via the first metamaterial optical element of the active infrared system, to one of the at least one lens assembly of the active infrared system and the at least one active camera of the active infrared system; and transmitting the uniform background light and the first laser waveband of the light, via the second metamaterial optical element of the active infrared system, to one of the at least one lens assembly of the active infrared system and the at least one active camera of the active infrared system. This exemplary embodiment or another exemplary embodiment may further include that the step of reflecting the at least one laser waveband of the light further comprises: reflecting a first range of laser wavelengths, via a first metamaterial optical element of the active infrared system, to the at least one lens assembly; and reflecting a second range of laser wavelengths, via a second metamaterial optical element of the active infrared system, to the at least one active camera upon receiving the first range of laser wavelengths from the at least one lens assembly. This exemplary embodiment or another exemplary embodiment may further include a step of emitting a uniform background light by at least one cold plate of the active infrared system; wherein the step of reflecting the at least one laser waveband of the light further comprises: reflecting a first laser waveband of the light of the remote object, via the at least one metamaterial optical element, to the at least one lens assembly; and wherein the step of transmitting the at least another laser waveband of the light further comprises: transmitting a second laser waveband of the light of the remote object, via the at least one metamaterial optical element, to a beam removal element of the active infrared system; and transmitting the uniform background light to the at least one lens assembly and the at least one active camera. This exemplary embodiment or another exemplary embodiment may further include a step of emitting a uniform background light by at least one cold plate of the active infrared system; wherein the step of reflecting the at least one laser waveband of the light further comprises: reflecting a first waveband of the light of the remote object, via the at least one metamaterial optical element, to the at least one active camera upon receiving the first waveband of the light from the at least one lens assembly; and wherein the step of transmitting the at least another waveband of the light further comprises: transmitting a second waveband of the light of the remote object, via the at least one metamaterial optical element, to a beam removal element of the active infrared system; and transmitting the uniform background light to the at least one active camera. This exemplary embodiment or another exemplary embodiment may further include that the step of reflecting the at least one laser waveband of the light further comprises: steering a first laser waveband of the light, via at least one metamaterial provided on at least one surface of the at least one metamaterial optical element, towards one of the at least one lens assembly and the at least one active camera; and steering a second laser waveband of the light, via at least another metamaterial provided on at least another surface of at least another metamaterial optical element towards one of the at least one lens assembly and the at least one active camera; wherein the at least one metamaterial optical filter and the at least another metamaterial optical filter are optically adjacent to one another.

It should be appreciated that the active IR systems described and illustrated herein may be configured to emit at least one laser beam and/or light to illuminate the desired scene and/or target in a particular operation to thus receive light reflected from the desired scene and/or target to acquire an active infrared image. While active IR systems have been described and illustrated herein, such components and metamaterials described herein may be used on other IR systems, including passive IR systems that utilize natural light to acquire a passive infrared image.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. An active infrared system, comprising:
   at least one metamaterial optical element;
   at least one lens assembly optically aligned with the at least one metamaterial optical element; and
   at least one active camera optically aligned with the at least one metamaterial optical element;
   wherein the at least one metamaterial optical element is configured with at least a reflection mode for reflecting at least one light waveband reflected by a remote object and a transmission mode for transmitting a uniform background light that is greater than the at least one light waveband reflected by the remote object.

2. The active infrared system of claim 1, wherein the at least one metamaterial optical element is configured to reflect the at least one light waveband to one of the at least one lens assembly and the at least one active camera in the reflection mode.

3. The active infrared system of claim 1, wherein the at least one metamaterial optical element is configured to transmit the uniform background light to one or both of the at least one lens assembly and the at least one active camera in the transmission mode.

4. The active infrared system of claim 1, further comprising:
at least another metamaterial optical element configured with at least another second reflection mode for reflecting at least another light waveband reflected by the remote object and a second transmission mode for transmitting the uniform background light.

5. The active infrared system of claim 1, wherein the at least one metamaterial optical element comprises:
a first metamaterial optical element having a first reflection mode for reflecting a first light waveband reflected by the remote object and a first transmission mode for transmitting the uniform background light;
wherein the first metamaterial optical element is configured to reflect the first light waveband to the at least one active camera in the first reflection mode;
wherein the first metamaterial optical element is configured to transmit the uniform background light to the at least one active camera in the first transmission mode.

6. The active infrared system of claim 5, wherein the at least one metamaterial optical element comprises:
a second metamaterial optical element having a second reflection mode for reflecting a second light waveband reflected by the remote object and a second transmission mode for transmitting the uniform background light;
wherein the second metamaterial optical element is configured to reflect the second light waveband to the at least one active camera in the second reflection mode;
wherein the first metamaterial optical element is configured to transmit the uniform background light to the at least one active camera and the first light waveband to the at least one active camera in the second transmission mode.

7. The active infrared system of claim 6, wherein the first reflection mode of the first metamaterial optical element and the second reflection mode of the second metamaterial optical element are different; and
wherein the first transmission mode of the first metamaterial optical element and the second transmission mode of the second metamaterial optical element are different.

8. The active infrared system of claim 1, wherein the at least one metamaterial optical element further comprises:
a first metamaterial optical element having a first reflecting mode configured to reflect a first range of laser wavebands to the at least one lens assembly; and
a second metamaterial optical element having a second reflecting mode configured to reflect a second range of laser wavebands received from the at least one lens assembly;
wherein the first range of wavelengths and the second range of wavelengths are different.

9. The active infrared system of claim 8, wherein the first metamaterial optical element is configured to be used as a bandpass filter and is optically positioned in front of the lens assembly; and
wherein the second metamaterial filter is a cold filter and is optically positioned between the at least one lens assembly and the at least one active camera.

10. The active infrared system of claim 1, further comprising:
at least one beam removal element optically aligned with the at least one metamaterial optical element;
wherein the at least one metamaterial optical element transmits at least another light waveband to the beam removal element.

11. The active infrared system of claim 10, further comprising:
at least one cold plate optically aligned with the at least one metamaterial optical element and adjacent with the at least one beam removal element;
wherein the at least one cold plate is configured to emit the uniform background light to provide a background noise at the at least one active camera.

12. The active infrared system of claim 11, further comprising:
a first filter structure formed on the at least one metamaterial optical element;
wherein the first filter structure is configured to reflect a first range of incident angles of the at least one light waveband.

13. The active infrared system of claim 12, further comprising:
a second filter structure formed on the at least one metamaterial optical element;
wherein the second filter structure is configured to reflect a second range of incident angles of the at least one light waveband that is different than the first range of incident angles of the at least one light waveband.

14. The active infrared system of claim 13, wherein when the at least one metamaterial optical element reflects the at least one light waveband to the at least one lens assembly, the least one metamaterial optical element is provided with the first filter structure; and
wherein when the at least one metamaterial optical element reflects the at least one light waveband to the at least one active camera, the least one metamaterial optical element is provided with the second filter structure.

15. The active infrared system of claim 1, further comprising:
at least one metamaterial provided on at least one surface of the at least one metamaterial optical element; and
at least another metamaterial provided on at least another surface of at least another metamaterial optical element;
wherein each of the at least one metamaterial and the at least another metamaterial is configured to achromatically steer the at least one light waveband to at least one angle to one of the at least one lens assembly and the at least one active camera.

* * * * *